United States Patent [19]

Sisson et al.

[11] 4,408,285

[45] Oct. 4, 1983

[54] VIBRATION ANALYZING APPARATUS AND METHOD

[75] Inventors: Edwin D. Sisson, Worthington; Robert S. Morrow, Dubin; Donn V. Stoutenburg, Westerville; Dean T. Davis, Columbus, all of Ohio

[73] Assignee: IRD Mechanalysis, Inc., Columbus, Ohio

[21] Appl. No.: 230,660

[22] Filed: Feb. 2, 1981

[51] Int. Cl.³ .............................................. G01M 7/00
[52] U.S. Cl. ...................... 364/508; 73/570; 73/602; 364/550
[58] Field of Search ............... 364/508, 550, 551, 552, 364/554, 507; 73/570, 577, 602, 618; 346/7

[56] References Cited

U.S. PATENT DOCUMENTS

| | | | |
|---|---|---|---|
| 2,917,918 | 12/1959 | Jenkins | 346/7 |
| 4,015,480 | 4/1977 | Giers | 364/508 |
| 4,089,055 | 5/1978 | Dyer et al. | 73/570 |
| 4,181,029 | 1/1980 | Talbott, Jr. | 364/508 |
| 4,184,205 | 1/1980 | Morrow | 364/508 |
| 4,213,346 | 7/1980 | Polovnikov et al. | 364/508 |

Primary Examiner—Errol A. Krass
Attorney, Agent, or Firm—Mueller and Smith

[57] ABSTRACT

Apparatus and method utilized in carrying out vibrational analysis wherein the output of a vibration monitoring transducer is treated by filtering in stepped fashion over a broad spectrum of frequencies. The stepped filtering is provided utilizing minimum dwell intervals at lower frequencies as determined by the number of steps involved per given bandwidth. A readout form of continuous printing provides a histographic analysis of amplitude and frequency and, optionally, an amplitude readout with respect to elapsed time. For the histographic readout, amplitude is plotted as a series of characters in linear form commencing with half peak amplitude and extending toward peak. Test and calibration procedures are provided for facilitating on site testing as well as servicing calibration procedures.

47 Claims, 31 Drawing Figures

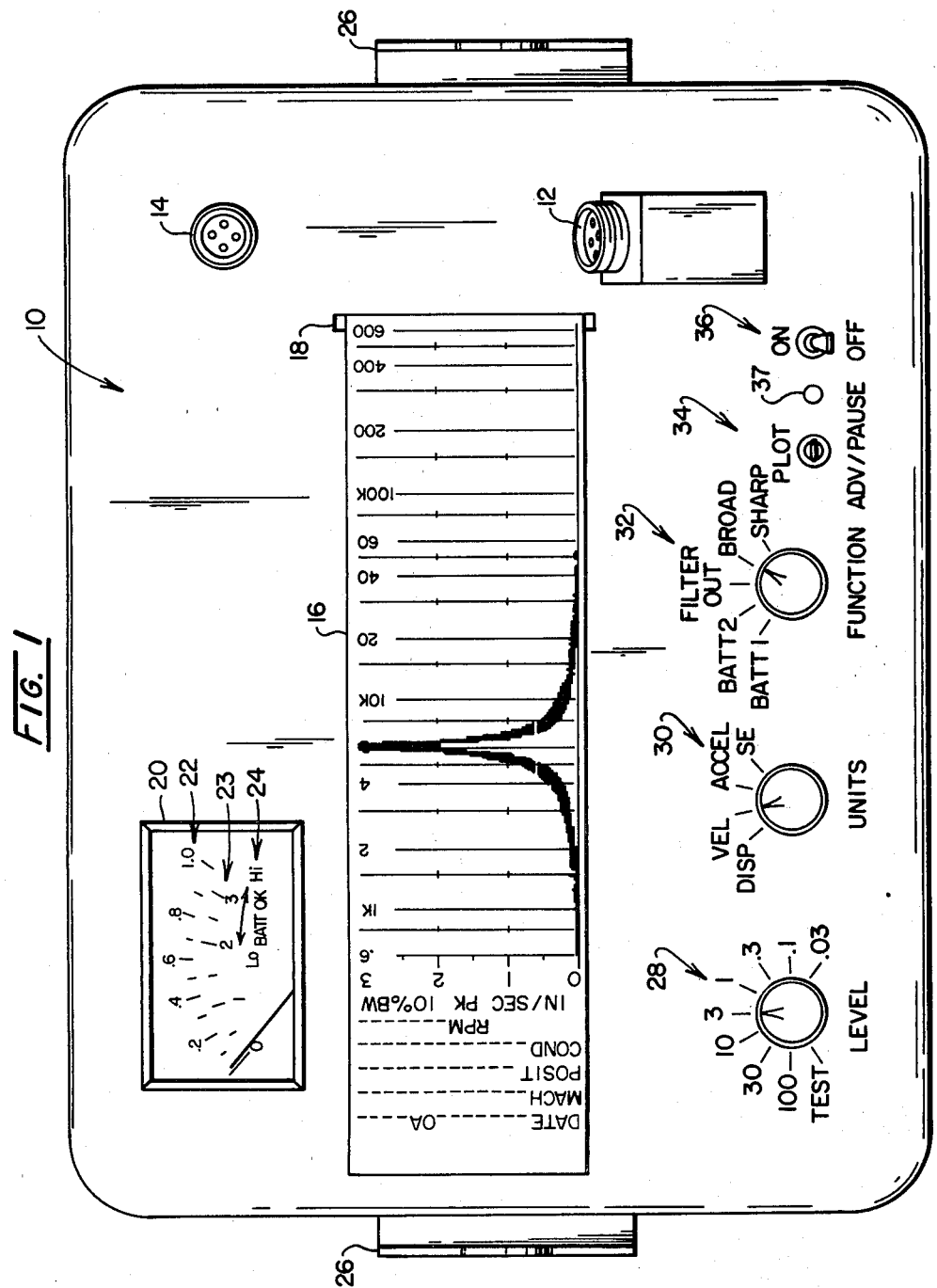

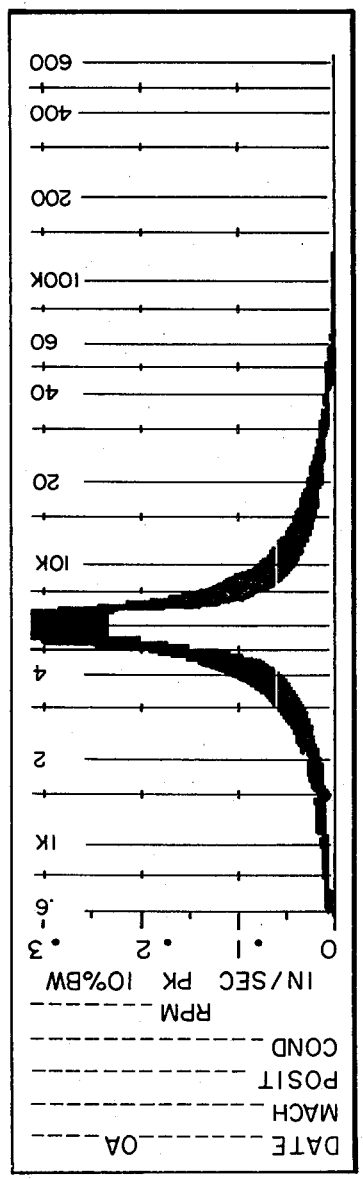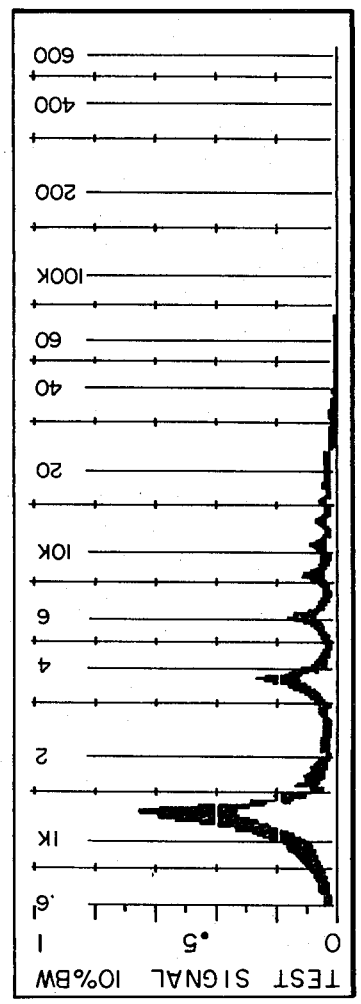

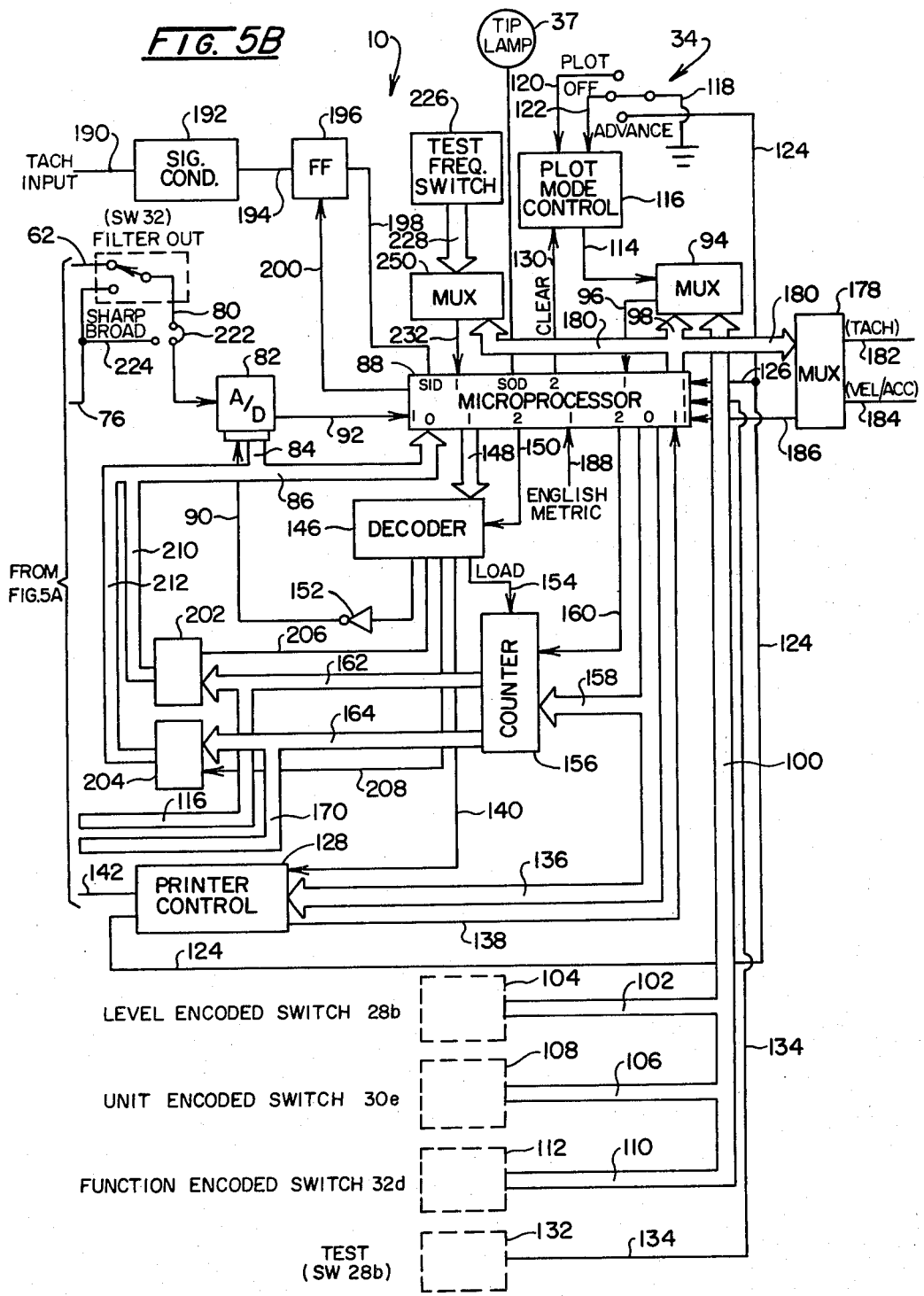

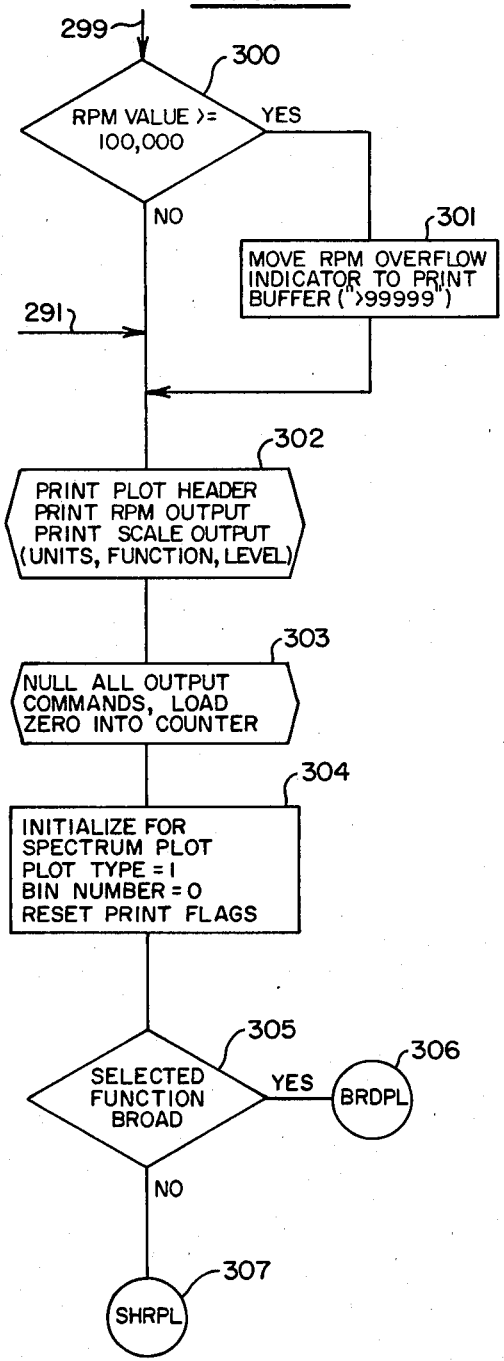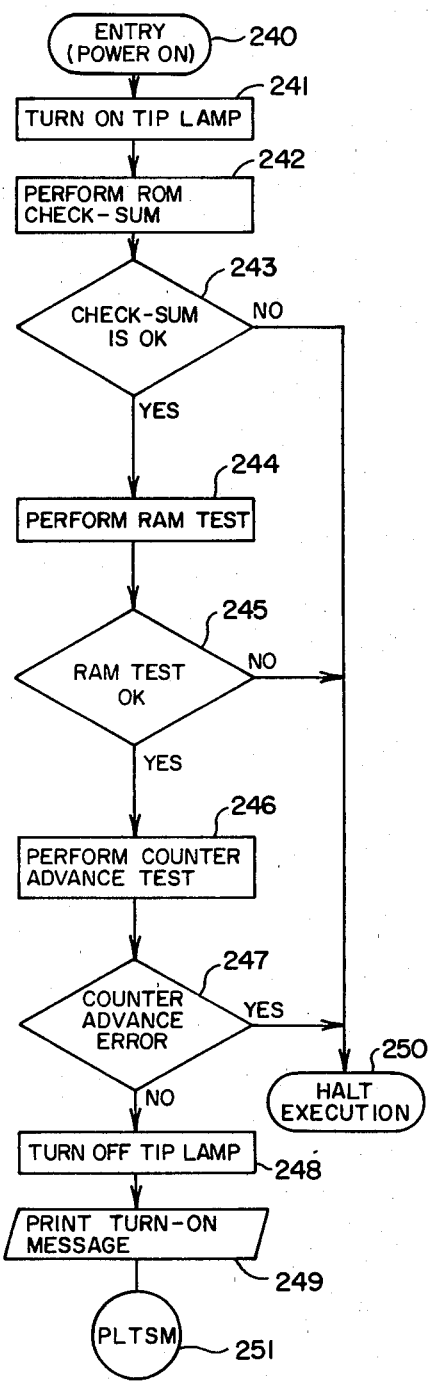

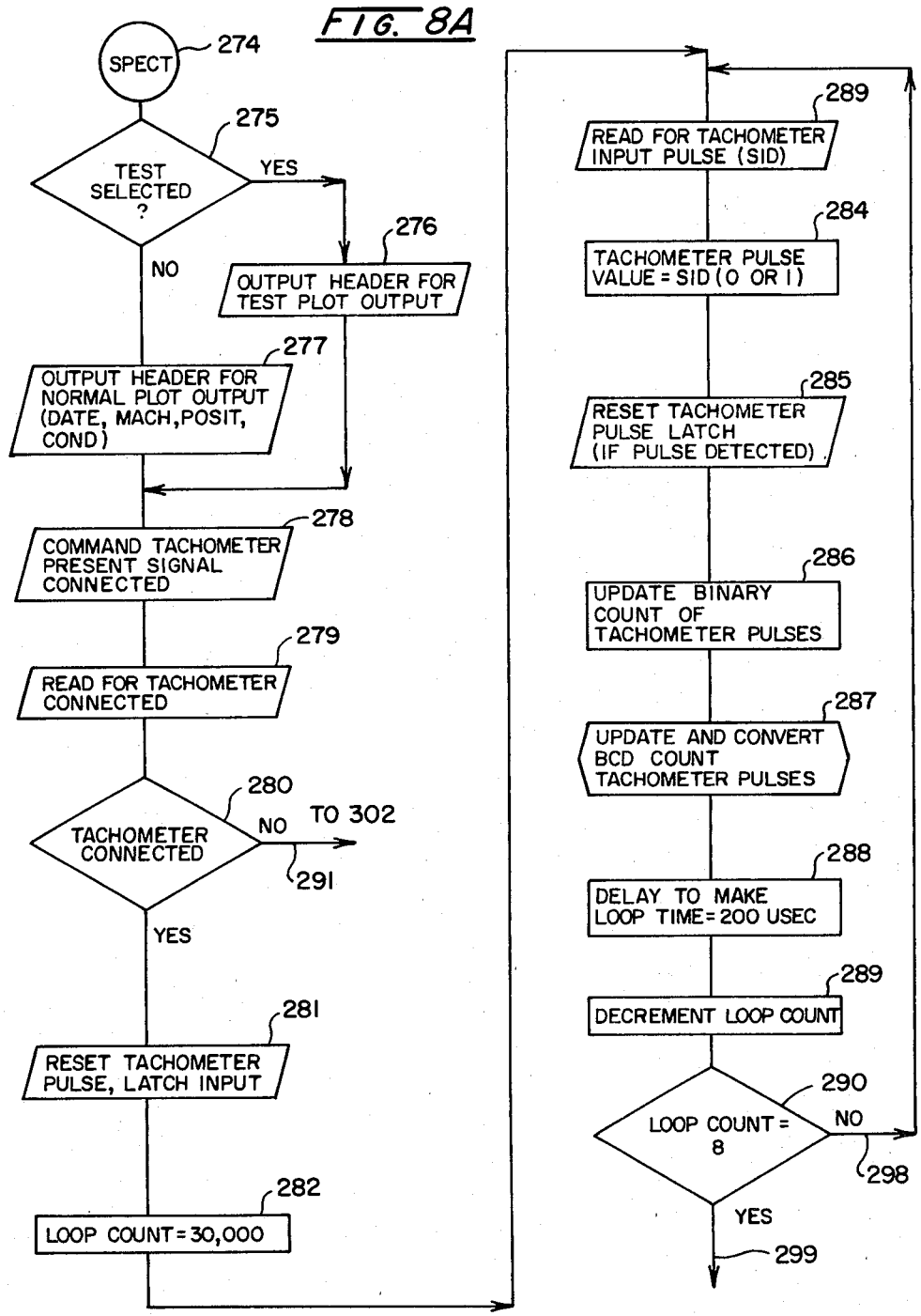

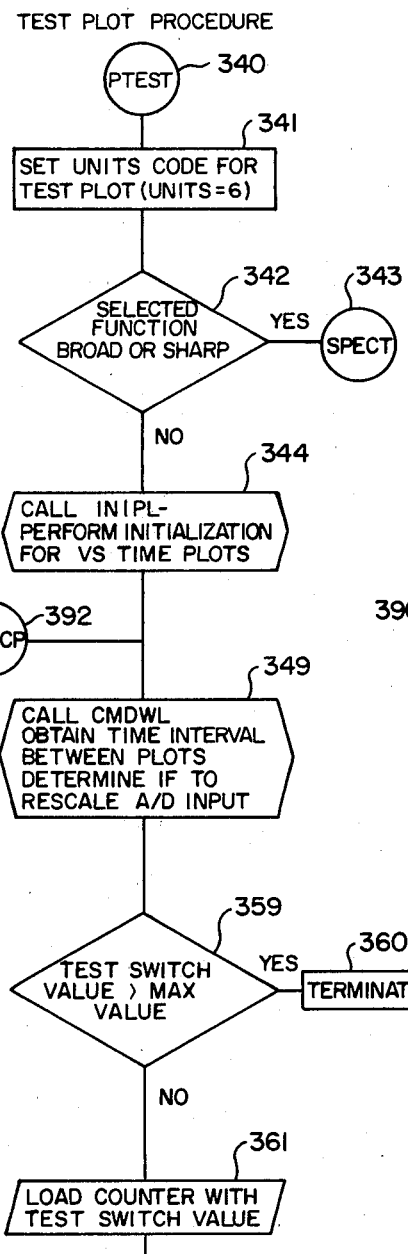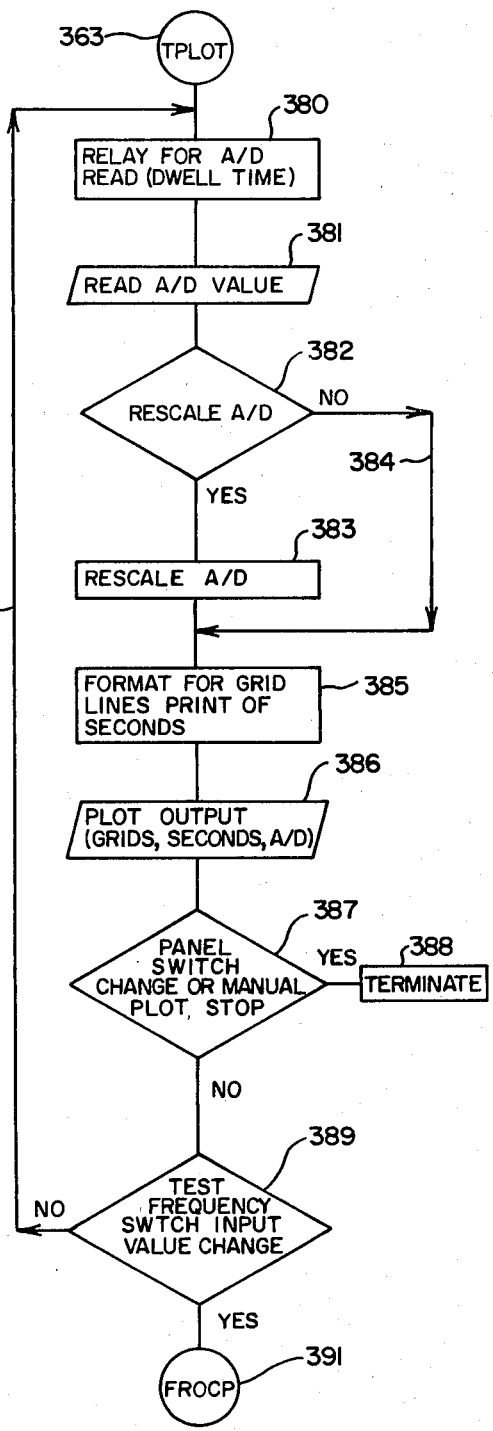

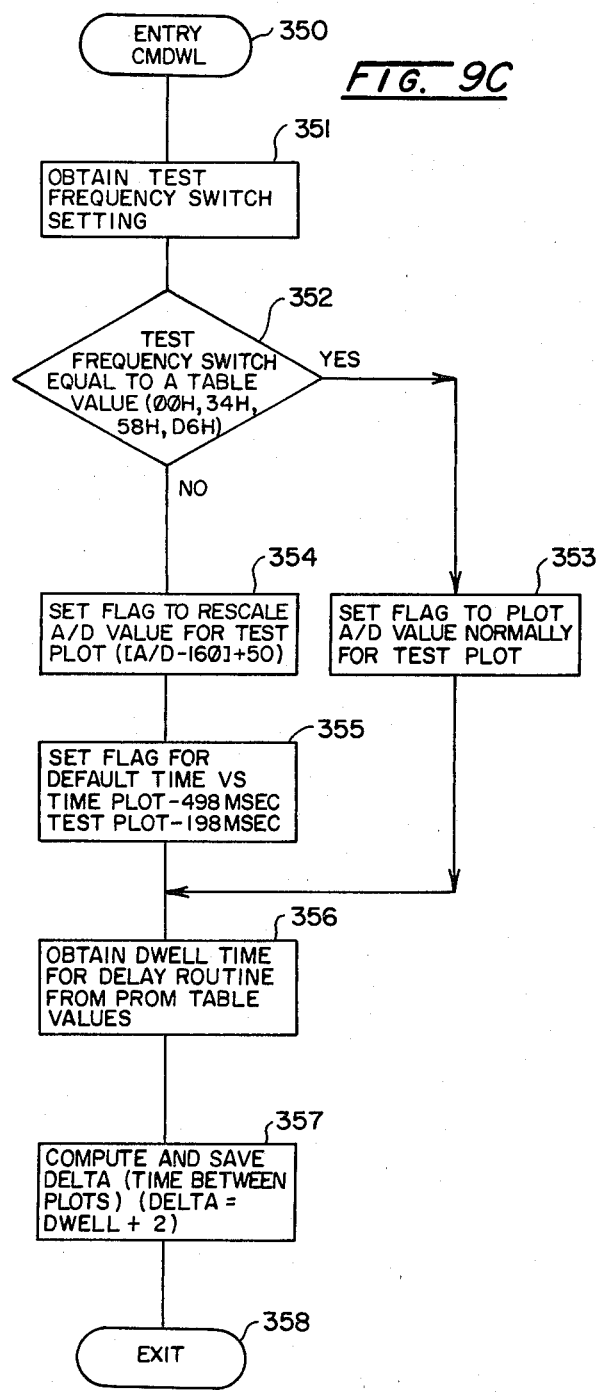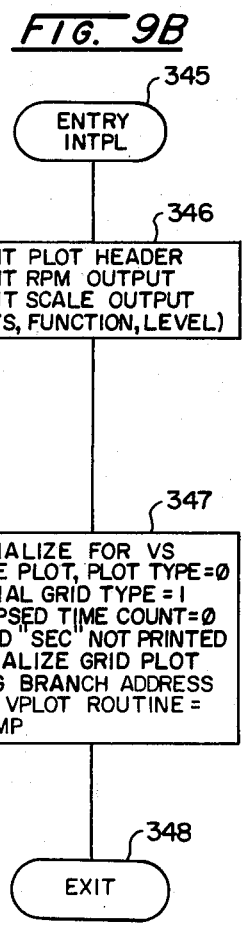

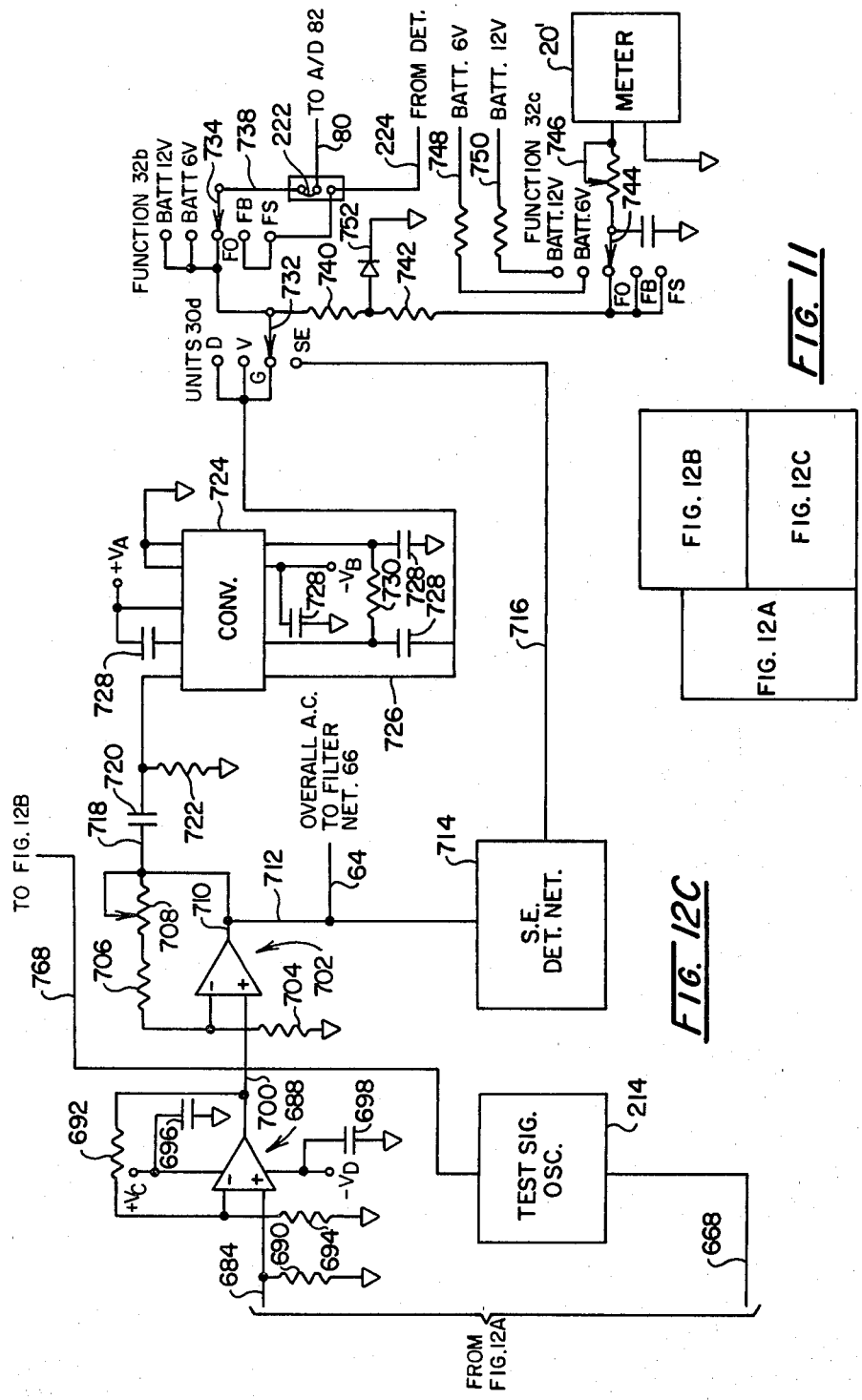

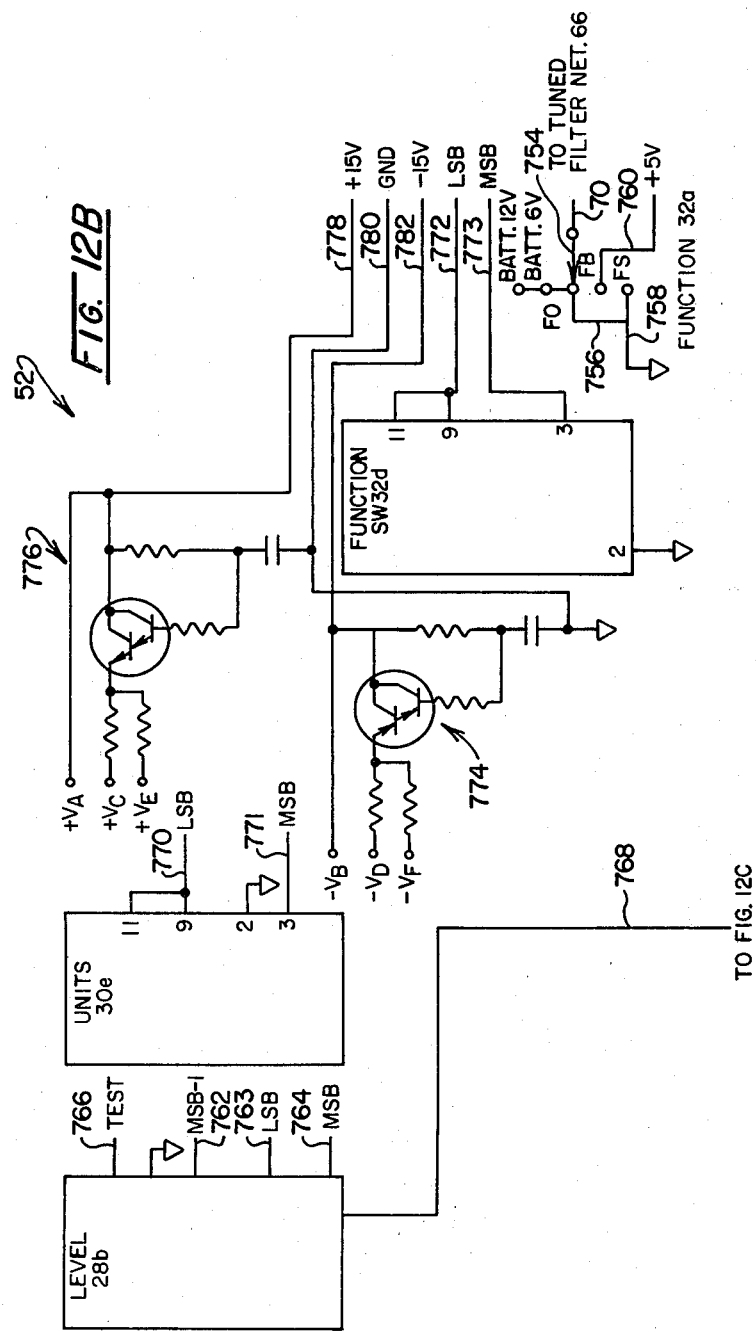

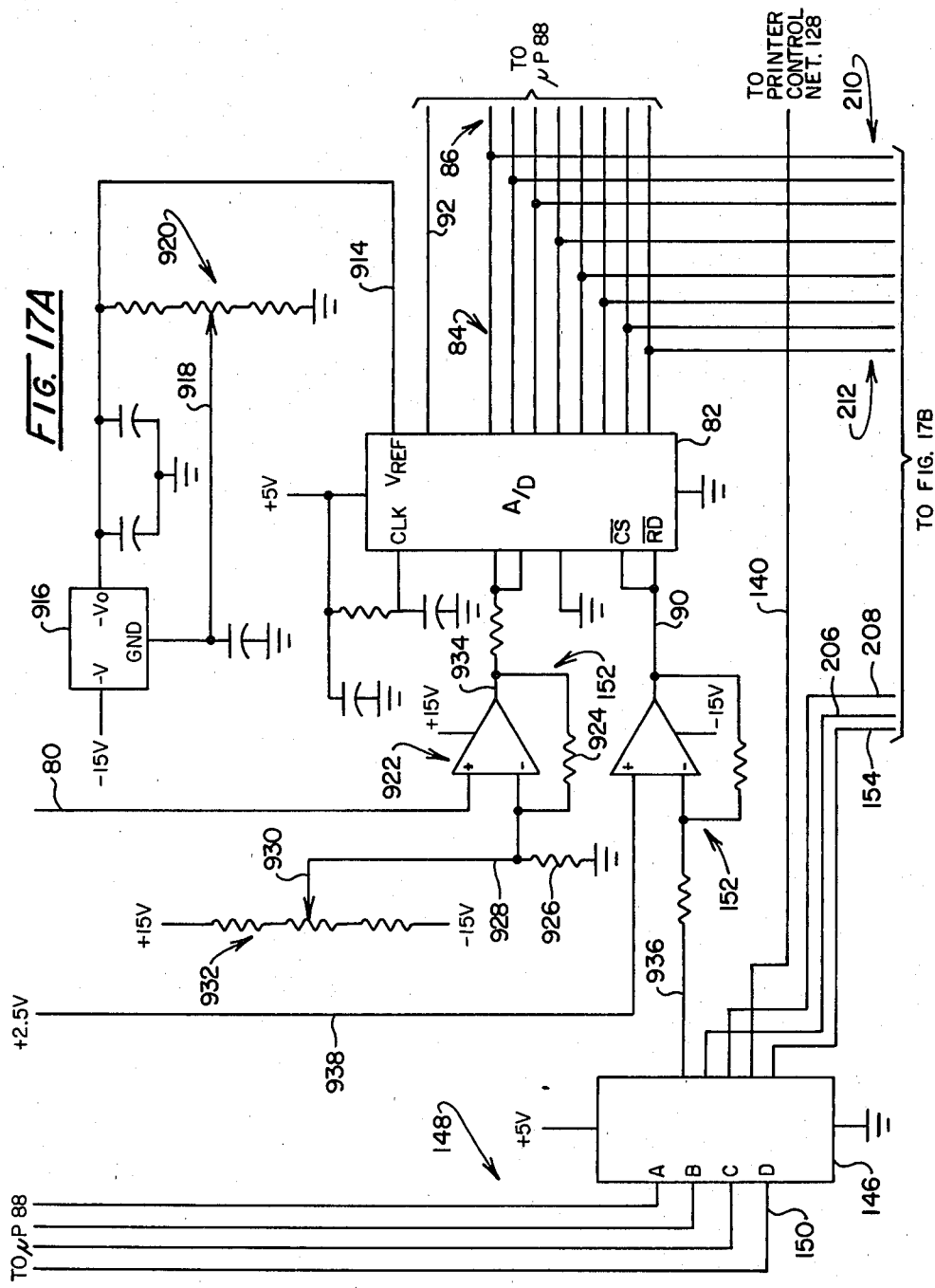

VIBRATION ANALYZING APPARATUS AND METHOD

BACKGROUND OF THE INVENTION

For a considerable period of time, industry has relied upon a concept for preventative maintenance which is based upon the detection, analysis and the correction of vibration in monitored machinery. Initially, periodic vibration measurements were made at various locations upon industrial machinery to detect an increase in vibration which represented a signal that machine deterioration was at hand. An analysis of vibration was found to provide information which could indicate a malfunction so that proper corrective action would be taken. This general concept of preventative maintenance has grown considerably to the extent that, for many industrial facilities, vibration monitors are permanently installed and automatically monitored. In the course of such monitoring, somewhat complex systems are employed which isolate and collect a variety of vibrational parameter data such as displacement, velocity and acceleration. These data are stored, and the devices then carry out a trend analysis thereon. Such data and trend information then periodically may be displayed or printed out and/or plotted for the use of maintenance and operational personnel.

Size and cost factors associated with the above-noted more elaborate, multi-function equipment have resulted in a necessity or continuing need for less elaborate, function-limited and portable vibration analysis equipment. Generally, such portable equipment comprises a probe and pickup component or transducer which is coupled with an analog meter for providing a visual readout which may be observed by the operator. Such operators, particularly when acting as consultants or the like, investigate a multitude of machines at various probe locations thereon in the course of their endeavors, and each reading taken will be evaluated and the results hand recorded. In the latter regard, such readings also must be mentally interpreted with respect to scale factors and the parameters which have been measured prior to recordation. Thus, opportunities for human error readily arise.

The functional limitations of simple portable equipment also have been observed to limit the capability of the operator for achieving a high level of confidence in the analysis of machine vibrations. For instance, readings over a broad range or spectrum of vibrational frequencies are most desirable for analysis as are readouts taken over given intervals of time. In the latter regard, continuous monitoring during the start-up and/or coastdown intervals of machinery operation has been found to be quite useful.

To accommodate for certain of the above needs, portable, battery-powered, on-site vibrational analysis devices have been introduced. However, the flexibility of their use has been observed to be limited. For example, the devices operate in conjunction with slow, conventional ink-pin type x-y plotters and discrete readout cards containing universal graticules or graphics which, as before, must be interpreted mentally as to scaling factors, off-scale aberrations and the like. Further, their frequency spectral ranges are limited, and the number of vibrational parameters available with their use are quite restricted. Also unavailable to the operators of earlier devices has been a capability for generating a rapid printout curve of overall vibrational amplitude with respect to time during startup or coast down procedures. Such information can be quite valuable, certain machine defects being detectable only during these limited periods of operation.

SUMMARY OF THE INVENTION

The present invention is addressed to apparatus and method for carrying out vibration analysis which provides a permanent, automatically scaled and easily interpreted readout in expedited fashion. This readout provides amplitude indications of vibrational parameters such as velocity, displacement, acceleration or high frequency characterized energy aspects in automatically scaled and labeled fashion. The readout may alternately be provided with respect to a broad frequency spectrum or with respect to time increments. Such readouts are evolved in permanently recorded fashion on a moving elongate paper strip by a small printer driven by conventional ASCII signals.

Where amplitude is plotted with respect to frequency, a step tuned filter is utilized which achieves resolution during step tuning across a broad frequency spectrum, while ideally minimizing requisite tuning dwell times during the incremental or step tuning at lower frequencies. For corresponding stepped graphical plots, discrete amplitudes are identified as lines in a somewhat histographic format, each amplitude line corresponding with a frequency value and being plotted commencing from a half peak amplitude value toward peak value. Thus, where off scale plotting conditions obtain, the operator readily may determine peak amplitude values even though the peak amplitude position has not been printed. This procedure simply involves multiplying the lower most plotted amplitude position by two. The positioning of discrete amplitude defining lines in the histographic plot is selected with respect to the bandwidth of the involved filter to achieve what in effect becomes an analog form of printout even though digital inputs are involved in its development.

Because a physical printout is provided as the principal output of the apparatus, various circuit arrangements are made which simplify otherwise difficult calibration procedures. In one aspect of this calibration, the sensitivity of the output of the apparatus is automatically multiplied and the test procedure is carried out in conjunction with a test frequency input signal and a time based printout. As a consequence, calibrating potentiometers and the like may be adjusted by personnel without resort to extraneous analog meters and the like.

Another object of the invention is to provide a method and apparatus for deriving a readout of the vibrational aspects of a dynamic device wherein such device is monitored by a transducer in operational association therewith to provide a vibration responsive output. Next, a filter is provided for filtering the vibration response of output in a stepwise fashion over a predetermined range of frequencies by applying tuning inputs to the filter in numbers of n steps per selected bandwidth. Each of these steps is asserted in conjunction with a dwell interval at least equivalent to $KQ^2/(1+K)f$ as n approaches infinity, where Q is the quality factor of the filter, K is a constant expressing the relationship between successive, step dependent center frequencies and f is a center frequency associated with a given, next preceding one of the noted n steps. The resultant succession of filtered output signals is converted to digital form and a frequency versus amplitude value readout then is provided in response to these digital signals. This readout is provided in histographic format and in a manner wherein the amplitude values are represented as linear form image components corresponding with each of the noted steps, each of the image components commencing with a graphic position of the amplitude value representing a predetermined fraction of peak value of the amplitude and extending in increasing amplitude value therefrom toward the peak value. In a preferred embodiment, the noted fraction is $\frac{1}{2}$. Further, the value of n preferably is selected as an integer having a value of at least about 3.

As another object and feature of the invention, the apparatus as above described further includes a level switch arrangement having a plurality of orientation responsive electable output conditions, each corresponding with a predetermined amplitude scale factor. The control arrangement of the apparatus incorporates a microprocessor which is responsive to an elected switch output condition for effecting a readout or printer printout of an amplitude defining pattern with a scale corresponding with the selected scale factor.

As another feature and object of the invention, the above-described apparatus includes a converter arrangement for deriving a vibrational signal as an amplitude related d.c. signal and incorporates an analog meter which is responsive to the d.c. amplitude related signal for providing a visual indication scale and analysis acceptability. For example, where such meter shows an erratic output, unusual load conditions may be encountered by the device analyzed to indicate to the operator that analysis should be made at a later time. Further, the analog meter may show an off scale condition which may be corrected by manipulation of the noted level switch before carrying out a printing analysis function.

As another aspect and feature of the invention, the above-described apparatus incorporates a test signal oscillator which is energizable to effect the assertion of a test signal of predetermined frequency amplitude at the noted filter. Thus, the operator may optionally carry out a test analysis of the operation of the apparatus.

As another feature and object of the invention the apparatus may provide a connector input for receiving a tachometer signal which is present as a sequence of pulses, each such pulse corresponding with a revolution of one component of the device under analysis. The microprocessor of the control arrangement of the apparatus responds the sequence of pulses when the tachometer is in operation over an interval of six seconds, applying a multiplication factor to the accumulated value of such pulses and generating a printout in correspondence therewith representing a rotational rate of ten revolutions per minute.

Other objects of the invention will, in part, be obvious and will, in part, appear hereinafter. The invention, accordingly, comprises the apparatus, process and system possessing the construction, steps and procedures, combination of elements and arrangement of parts which are exemplified in the following detailed disclosure.

For a fuller understanding of the nature and objects of the invention, reference should be had to the following Detailed Description taken in connection with the accompanying drawings.

BRIEF DESCRIPTION OF THE DRAWINGS

FIG. 1 is a top view of vibration analysis apparatus according to the invention;

FIG. 2 is a plot producible by the apparatus of FIG. 1;

FIG. 4 is a test signal plot derivable from the apparatus of FIG. 1;

FIGS. 5A and 5B show a broad schematic representation of the control circuitry of the apparatus of FIG. 1;

FIGS. 7A-7B show a flow chart describing initial circuit testing and configurational procedures for the processor of the apparatus of the invention;

FIGS. 8A-8C are a flow chart representing the microinstructions utilized for carrying out a spectral analysis with the apparatus of the invention;

FIGS. 9A-9D are a flow chart showing the microinstructions utilized in carrying out a test procedure with the apparatus of the invention;

FIG. 11 is a schematic portrayal of the orientation of FIGS. 12A-12C for observing their interrelationship;

FIGS. 12A-12C show circuit components corresponding with block 52 of FIG. 5A;

FIGS. 17A-17B provide a circuit diagram showing analog to digital conversion and counting functions of the circuit of the invention;

DETAILED DESCRIPTION

Figure 6:
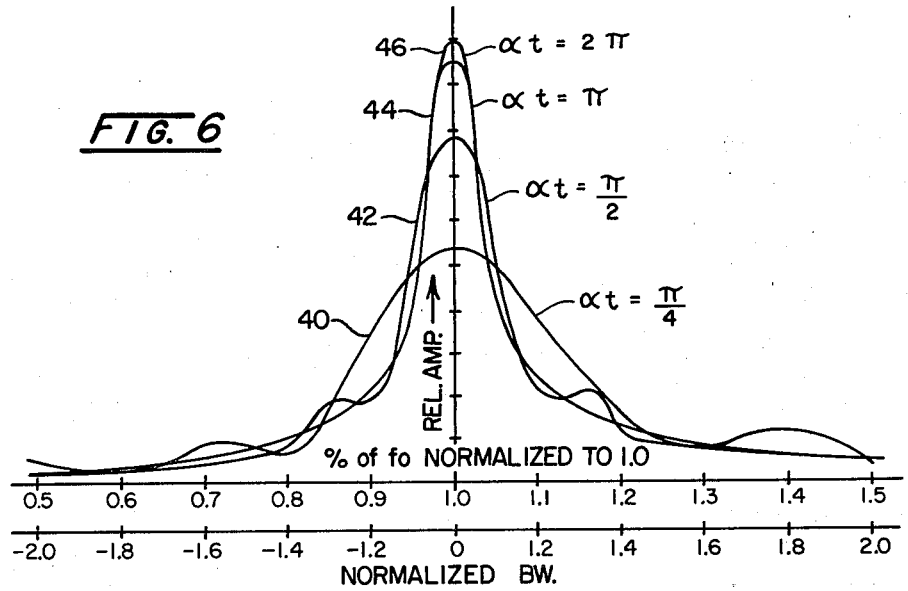
FIG. 6 shows a family of curves representing dynamic bandwidths for various dwell times of the apparatus of FIG. 1.

The vibration analyzer apparatus of the invention is compact and battery-powered and, thus, is suited for a wide range of machinery analyzing application. Designed to avoid the occurrence of human error, while minimizing the labor intensity which may be associated with its use. The apparatus retains a capability for carrying out a broad frequency spectrum plot in stepped fashion within an unusually short time interval. Enjoying a highly diverse utility, the apparatus is capable of automatically plotting vibrational phenomena over a frequency range of 10 to 10,000 Hz and is further capable of plotting overall vibration amplitude versus time for any convenient interval of time desired by the user. Further, the apparatus is capable of measuring a parameter known in the pertinent field as "Spike Energy"

amplitude versus time, the latter arrangement detecting ultrasonic energy bursts caused, for example, by microscopic defects in bearings, gears and the like.

The apparatus may be retained in a convenient, rectangular case, the handmanipular components thereof being located in a normally horizontally oriented top surface thereof for operator convenience. Referring to FIG. 1, the apparatus is revealed in general at 10, the figure showing a top view to reveal the noted normally horizontal upwardly disposed operational surface. The figure shows a pickup signal input receptacle 12 which may be present as a twist-lock female receptacle suited for connection with the signal input cable from, for example, an accelerometer or velocity pickup device. Such devices, may, for example, be provided as a "Model 970 Accelerometer" or "Model 544 Velocity Pickup" device marketed by IRD Mechanalysis, Inc., Columbus, Ohio. In keeping with a requirement for portability, apparatus 10 incorporates rechargable batteries, such recharging being carried out at convenient times by the connection of an a.c. source to a charger input receptacle 14 which, in conventional fashion, may be present as a threaded female-type connector.

The principal readout of apparatus 10 is printed upon a continuous strip of 2¼ in. thermal paper by a printer/plotter (not shown) located within the instrument case. An exemplary velocity versus frequency printout on such thermal paper is shown at 16 extending across the upward surface of apparatus 10 from an output slot 18. On one side of the panel located above the printout strip 16 is an amplitude meter 20 having two amplitude scales 22 and 23 suited for indicating the overall amplitude of unfiltered vibration detected by the transducers or pickups of the system. Positioned immediately beneath scales 22 and 23 is a battery condition scale 24. When utilized for indicating overall amplitude, meter 20 provides valuable information to the operator, particularly, in determining the presence of defective pickups or a transient machinery condition which is not suited for proper vibrational analysis. In the latter regard, the erratic behavior of the needle will provide advice to the operator to delay carrying out a vibration monitoring procedure.

Grips 26 are provided at either side of the instrument 10 and intermediate those grips is an array of five switches. The initial one of these switches at 28 is a binary encoded level switch which permits the selection of scale for the parameter being plotted. Such parameter may be displacement, velocity, acceleration or the earlier described "Spike Energy." Switch 28 additionally includes a TEST position which is utilized to check the operation of the circuitry of the device. When in this position, a value indication in the range, for example, 0.75 to 0.85 at scale 22 of meter 20, provides a preliminary indication that all circuits are operating correctly. Additionally, as will be described in more detail later herein, a test mode plot is provided upon strip 16.

Adjacent switch 28 is a binary encoded units selector switch 30, manipulation of which permits the operator to select the parameter or measuring unit desired, for example, DISP (displacement), VEL (velocity), ACCEL (acceleration), or SE ("Spike Energy").

Next adjacent switch 30 is a binary encoded function selector switch 32 having a SHARP position for selecting a 5% bandwidth in conjunction with frequency related plotting for highest resolution. Switch 32 additionally includes a BROAD designation representing a 10% bandwidth. Both the SHARP and BROAD positions are used the earlier described filter sweep range of 10–10,000 Hz. The FILTER OUT position of switch 32 permits the derivation of overall amplitude of the particular vibrational parameter selected, while the BATT 1 and BATT 2 positions provide for the testing of two batteries within the instrument 10, such checking being carried out by observing the needle of meter 20 with respect to scale 24.

Next adjacent to switch 32 is a plot-advance/pause switch 34 which is a three-position spring-return toggle switch. When pushed toward the PLOT position momentarily, the switch initiates or terminates an automatic plot upon strip 16. When held in the ADVANCE PAUSE position, the strip 16 is caused to advance without printing or is caused to pause if printing in the FILTER OUT function. Finally, adjacent to switch 34 is a conventional power switch 36 adjacent to which is a test in progress lamp 37 which may be present as a conventional LED.

From the foregoing, it may be observed, that upon attaching a transducer or probe at an appropriate location upon a machine to be monitored, and affixing the cable extension of that probe to connector 12, the operator selects the desired positioning of switches 28 through 36. FIG. 1 reveals one such selection wherein the velocity of monitored vibration is to be determined as represented by switch 30, a broad or 10% bandwidth is to be evaluated as represented by the selection of switch 32 and a scale factor of 0 to 3 is selected as represented at switch 28. Utilizing microprocessor related technique, upon turning system on with power switch 36 a leader first is printed by the system initially indicating the carrying out of a microprocessor test as being "OK," following which advice is given the operator that the battery or system should be checked as necessary. An exemplary printout for providing vibrational analysis for the selected switch settings is portrayed upon strip 16. To cause the apparatus to print out this form of spectral analysis, switch 34 is momentarily actuated to the PLOT position and released. The system first prints out a space for filling in a date as well as an initial overall amplitude reading at meter 20. Following the above, a space for identifying the machine analyzed as well as the position of the transducer or probe thereon is provided as well as a space for filling in the general condition of the machine. Apparatus 10 then, if appropriate tachometer components are attached thereto, delays precisely six seconds following which, it prints out a basic rotational speed (RPM) for the principal rotating component of the machinery being analyzed. At the termination of this six-second interval and RPM printout, a vibrational spectral analysis is carried out automatically in stepped fasion from, for example, a frequency of 0.6 cpm to a frequency of 600K cpm. One type filter which may be utilized in achieving this analysis is voltage tuned on a stepped basis and exhibits a constant Q characteristic (Q is considered to be ratio of resonance frequency divided by bandwidth). Such filters are manufactured, for example, by D.B. Developments of Rome, N.Y., and an alternate, preferred filter is described later herein. In consequence of the noted constant Q characteristic, the graticules of the frequency spectrum plot are spaced in logrithmic fashion, select ones of which being labeled with frequency (cpm) valuations. For the example shown, the selected velocity is represented in inches per second peak to peak, and the broad bandwidth selection is represented as being 10% BW. The printout of frequency spectrum is represented as a form of histogram fashioned of discrete lines spaced sufficiently to define discrete upper limits or points outlining the analog nature of the basic curve developed. A study of the graphics involved has resulted in, for example, the development of about three histographic lines per sharp or 5% bandwidth which results in a frequency change or multiplier factor of 1.016 between lines or three line definitions per bandwidth. This shows there to be 1.6% change for the sharp bandwidth or about 3.125 lines per bandwidth. Correspondingly, for the broad or 10% bandwidth, a multiplication factor 1.026 between lines is developed representing about 2.6% change in bandwidth between lines or about four lines per bandwidth.

Another important feature of the frequency related readouts of the instrument 10, whether considering broad or short bandwidths or for whatever units are elected, resides in the commencement of each curve defining line at a level of 50% of the amplitude to be defined by such histogram line. As a consequence, for off-scale values of up to about 50%, the operator is afforded the capability of simply reading the lowermost level of the histogram line and doubling it to find true amplitude.

Looking to FIG. 2, a condition is represented wherein the noted lower levels of several of the maximum amplitude lines are positioned at the same amplitude as opposed to exhibiting a typical "peaking" contour. This indicates an overscale saturation. When such a readout is obtained, the operator merely alters the scale by manipulation of switch 28 to a higher scale level, whereupon the plot automatically terminates and when plot switch 34 is actuated into the momentary "PLOT" position a replotting across the broad frequency spectrum is carried out. As is apparent from the discussion above, a broad variety of readouts are available to the operator for purposes of carrying out an analysis. In this regard, the broad selection at switch 32 provides a 10% bandwidth readout, while the sharp designation provides a 5% bandwidth. The units switch 30 may provide for the spectral analysis with respect to a selected displacement, velocity, or acceleration. Of course, the selection of these units will depend upon a proper selection of the transducer or probe utilized.

Another advantage deriving from the histographic configuration of the frequency-amplitude plot resides in a capability for determining the frequency of a typical signal peak with considerable accuracy, for example, within about 1.5% for a 5% bandwidth selection and about 2.5% for a 10% bandwidth selection. The procedure for determining peak frequency involves the step of first locating that frequency defining graticule line next lowest adjacent the peak frequency being determined. By then counting the number of lines from that graticule to the line defining peak signal and by raising the above-described line multiplier factor by the count so determined and multiplying the results by the frequency of the frequency defining graticule line first located, the peak frequency may be determined. As noted above, exemplary such factors for a 5% bandwidth are 1.016 and, correspondingly, for the 10% bandwidth, such factor will be 1.026.

Figure 3A:
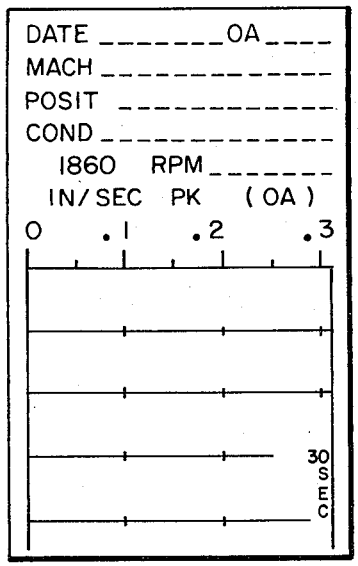
FIGS. 3A-3C show three related plots and associated scale changes derivable from the apparatus of FIG. 1.
Figure 3B:
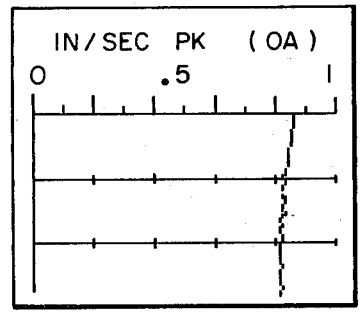
Figure 3C:
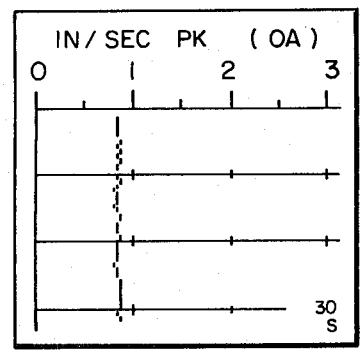

By maneuvering switch 32 to the FILTER OUT position, overall amplitude readings may be obtained for given unit selections made by manipulating switch 30. These readings are time based and identified by reference lines calibrated in terms of tens of seconds. Such an arrangement provides for continuous plotting in response to the initial actuation of switch 34 to the PLOT position and release thereof. The time base plotting activity is terminated by again momentarily actuating switch 34 to the PLOT position. Looking to FIGS. 3A–3C, an exemplary time plot is revealed, FIG. 3A showing an exemplary lead printout with, where a tachometer is utilized, an RPM readout and an overscale condition. Where the level switch 28 is moved from the identified 0.3 position to the 1 position, the apparatus 10 will automatically convert to the readout shown in FIG. 3B for the same signal input. Correspondingly, should switch 28 then be actuated to the 3 position, the readout immediately is converted to that represented in FIG. 3C. A variety of parameters can be analyzed on the noted time base, including a "Spike Energy" valuation.

It may be observed that for any function and any scale selected in conjunction with switches 28 and 32, a correspondingly annotated printout is provided by apparatus 10. Accordingly, the operator is not called upon to translate the data in the course of carrying out a vibrational analysis. This minimizes the opportunity for operator error. Further, in the course of analysis with respect to frequency, automatic plotting takes place over three decades without requiring operator switching and the like to proceed from one frequency range to another. The use of time based plots of overall amplitude are quite valuable in the noted start-up or coast-down. In the latter regard, machinery may pass through highly harmful vibrational ranges only in the course of such start-up or coast-down. With the time based overall amplitude plotting feature, such harmful performance may be isolated for identification and ultimate correction.

The selection of a TEST position, at switch 28 permits the operator to carry out a test of the operation of apparatus 10. In this regard, with such positioning of switch 28 in conjunction with a selection of the BROAD position of function switch 32 and subsequent actuation of switch 34, a test signal will be introduced to the circuitry of the apparatus which is comprised of a squarewave voltage at 20 Hz and 0.8 full scale. A typical test readout is revealed in FIG. 4 and during the development of this histographic plot, the operator may observe the overall amplitude at meter 20 as falling within predetermined limits. The total plot time for the test will require less than one minute as noted above for a 10% bandwidth selection. Further observation of the test signal printout will show a spectrum primary component at a predetermined position, for example 1.2 Kcpm, and at about 0.7 of full scale. Additionally, the odd harmonics of the test signal may be observed to complete the test analysis. This operator test procedure also may be utilized with the SHARP or 5% bandwidth designation as well as in conjunction with overall amplitude, the latter requiring that switch 32 be positioned at the FILTER OUT orientation. As will be described in more detail later herein, in addition to the operator test and program test described above, the apparatus 10 also includes a design arrangement for enhancing the carrying out of certain maintenance tests.

Inasmuch as proper switch selection is required to make full utilization of the capabilites of the analyzing apparatus 10, where an improper switch selection is made or if an improper transducer is utilized in conjunction with a given switch selection, then an instructional printout is provided to the operator. The implementation of such features are described later herein in enhanced detail.

Figure 5A:
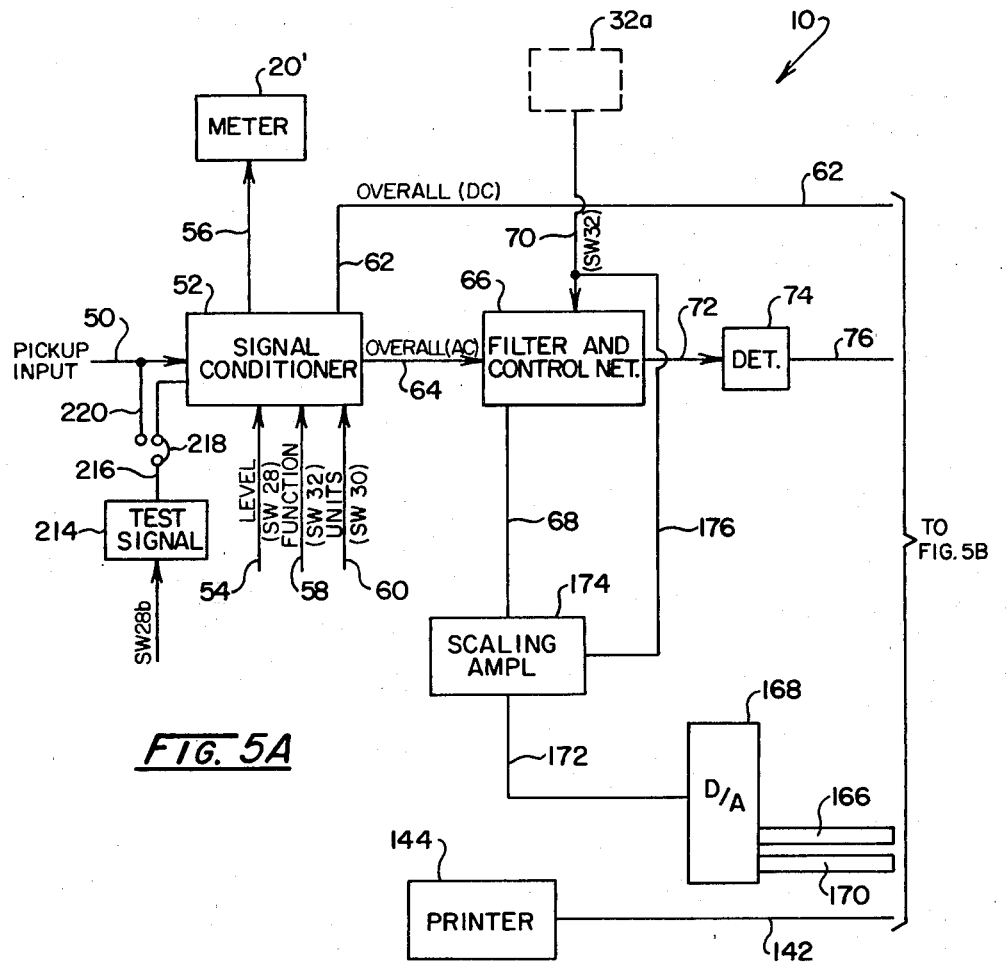

Referring to FIGS. 5A and 5B, an overall schematic representation of the vibrational analyzer of the invention is revealed. Looking to FIG. 5A, the transducer input to analyzer 10 is represented in general fashion at line 50. A piezoelectric form of accelerometer is utilized for evolving "Spike Energy", acceleration and velocity, while a moving coil-type velocity pickup transducer is utilized for developing velocity information and, where desired, converting it to displacement. Input line 50 is shown extending to a signal conditioner circuit represented by block 52. Signal conditioner function 52 responds to the relatively low level signal generated by the transducers, provides amplification and, responding to the level selection of switch 28 as represented at line 54, provides an overall amplitude readout at meter 20 as represented at 20' in the figure. The association of meter 20 with signal conditioner 52 is represented by line 56. Signal conditioner circuit 52 additionally responds to the function selection at switch 32 as represented at line 58 and the unit selection of switch 30 as represented at line 60 to carry out, where appropriate, integration of the accelerometer transducer derived input to provide a corresponding velocity signal. Similarly, a velocity responsive signal at input 50 may be integrated to derive a displacement related output. When units switch 30 is in the "Spike Energy," SE, orientation, the signal conditioner circuit 52 treats the ultrasonic signal to provide a signal which, in effect, corresponds to a differentiation of an acceleration signal accompanied by special peak-to-peak detection circuits. Accordingly, when switch 32 is oriented at the FILTER OUT position, and switch 30 is oriented to the SE position, the so detected "Spike Energy" related signal is presented along line 62. Line 62 also carries the overall, true RMS signal developed for the FILTER OUT orientation of switch 32 as related to the level selection of switch 28 and other units selection at switch 30.

The function, level and units conditioned overall a.c. signal evolved from signal conditioner circuit 52 is at line 64 as extending to the input of a filter and control network represented at block 66. As noted above, the filter utilized within network 66 is configured having a constant Q characteristic and is voltaged tuned in response to a d.c. voltage input submitted thereto from along line 68. Filter 66 also responds to the BROAD or SHARP bandwidth selection made by the operator at switch 32 as represented generally at line 70. The output of filter and control network 66 is present at line 72 and is directed to a full wave detector and low pass filter network represented at block 74. The output of network 74 is present at line 76 which, along with the overall RMS signal at line 62, is introduced to one component of function switch 32, the latter along with switches 28 and 30 being of a multi-decked variety providing various logic inputs. That component of switch 32 which discriminates between the use of filter network 66 and bypassing thereof is represented by dashed boundary labeled sw32b and, as illustrated, serves a filter-out function when connecting line 80 with line 62 and a designation of either the selection of a SHARP or BROAD bandwidth when coupled with line 76 which, in turn, represents the output of network 74.

Line 80 is shown directed to the input of an analog to digital converter 82 within which device the d.c. signal at line 80 is converted to binary format and outputted along bus 84 to common connection with leads of principal bus 86, in turn, leading to the appropriate input ports of a microprocessor system 88. Converter 82 is selectively enabled from along line 90 and provides when appropriate, a busy signal input to microprocessor system 88 from line 92.

Microprocessor system 88 may, for example, be present as as type PLS-858 one card system marketed by Pro-Log Corporation, Monterey, Calif. The system provides a complete microprocessor function incorporating 1,024 bytes, a read/write memory as well as a conventional program or control store memory. The system is a two-way bus oriented on incorporating three 8-bit output ports, two 8-bit input ports, interrupt inputs, serial input and output lines, power on and external reset features and an on-board crystal clock as well as a conventional processor, for example a type 8085 produced by Pro-Log Corporation (supra). The programmable memory of microprocessor 88 includes addressable data representing the logrithmic position, often designated "bin" position for each plottable point of the frequency spectral analysis carried out by the system. Designated or addressable bin locations correspond with the position of each histographic line developed as well as the graticule positions of the plot format. The bin locations also will include data for the arithmetic unit computation of dwell times which, as indicated above, up to the level of required printing interval times will have a minimum ideal valuation of $KQ^2/(1+K)f_1$ as discussed later, which valuation is adjusted by the value, n, of steps. Considering the addressable memory bin locations, for a 5% or SHARP bandwidth performance, 431 bins may be used to identify plot positions along the frequency spectrum from 10 Hz to 10 Khz. Correspondingly, where a 10% or BROAD bandwidth operation is contemplated, 265 bins over the same frequency range are utilized.

Switching logic inputs to microprocessor system 88 are provided from a multiplexer 94 from along output line 96. Multiplexer 94 is addressed from a three line bus 98 extending from microprocessor system 88 and receives its switch logic input from a seven line bus 100 which extends, in turn, through three line bus 102 to components of level encoded switch 28 represented at 28b by a dashed boundary, a two-line bus 106 extending from components of unit encoded switch 30 as represented at 30e by dashed boundary 108 and a two line bus 110 extending from components of function encoded switch 32, such components being represented at 32d by dashed boundary 112. Multiplexer 94 is presented by an eighth input in the form of a plot-start/stop signal presented along line 114 and emanating from a plot mode control network represented at block 116. Network 116, in turn, responds to the actuation of plot-advance switch 34, the common arm of which is coupled by line 118 to ground to provide an active low logic. To carry out a plot start or stop command, the arm of switch 34 is positioned to connect line 120 to ground, while its normal off position couples line 122 to ground. To carry out a paper advance operation, the switch arm is coupled to line 124 which extends through line 126 to microprocessor system 88 as well as to the paper advance enable input of a printer control network represented by block 128. A reset or clear signal is provided to plot mode control network 116 from microprocessor system 88 through line 130. Thus, depending upon the switch orientations selected by the operator, microprocessor system 88 draws upon selected switching logic when required by appropriate addresses to multiplexer 94 through bus 98. The components of level switch 28 which are active when in a TEST orientation represented at 28b by a dashed boundary and provide an input to microprocessor system 88 directly through lead 134.

Print command logic in the form of ASCII coded signals is provided by microprocessor system 88 through an eight line bus 136. The control network 128, in turn, provides a status or busy indication for microprocessor system 88 utilization along line 138, and the coded data is strobed into control 128 from along line 140. The output of printer control network 128 is represented by a line 142 extending to input of a thermal printer represented by block 144. Typically, such printers have a maximum print or plot speed of 100 ms per character line. The printers are marketed, for example, as model PP201 by B-G Instruments, Inc., Alta Loma, Calif. It may be observed that the plotting rate of the printer becomes a limiting factor in developing a total frequency spectrum analysis at such time as the computed dwell time approaches and reaches the plotting time limit.

The strobe input at line 140 to printer control network 128 emanates from one output of a three line to eight line decoder 146. Serving as a principal control over peripheral components of the system, decoder 146 receives a three line coded input at three line bus 148 from microprocessor system 88 and is strobed therefrom from along line 150. Another output of decoder 146 is the earlier described line 90 incorporating an inverter function 152 and utilized to enable A/D converter 82. Another output of decoder 146 is present at line 154 which extends to and provides a load signal for a nine bit output counter function represented by block 156. Counter 156 is configured for receiving an eight bit jam binary numerical input in parallel fashion from along eight lead bus 158, coupled in turn through bus 136 to an output port of microprocessor system 88. Additionally, the microprocessor system 88 is configured for submitting a counter advance pulse to counter 156 from along line 160. With the arrangement, a predetermined count value can be asserted at counter 156 for carrying out checking procedures. The nine bit output of counter 156 is utilzed for the purposes of providing the stepped voltage levels ultimately asserted through line 68 for carrying out tuning of voltage tuned filter 66. These nine bits are presented at output busses 162 and 164, the former carrying the four most significant bits and the latter carrying the five least significant bits of a given count valuation. Bus 162 extends through corresponding bus 166 to a corresponding four inputs of a digital-to-analog converter 168, while bus 164 extends through corresponding bus 170 to provide the remaining five bit inputs to converter 168. In conventional fashion, converter 168 converts the digital inputs submitted thereto to a d.c. value at its output at line 172. Line 172 extends to a scaling amplification function represented at block 174 which, in turn, responds to the operator selection of BROAD or SHARP bandwidth from function switch 32, such input being represented by a line 176 extending from line 70. The output of scaling and amplification function 174 is represented by the earlier described line 68 which extends to filter function 66. In the course of a scan over the predetermined frequency spectrum of the system, line 68 will evidence a progression of stepped voltage values ranging from, for example, 0 to 10 volts d.c. The stepped valuations will vary in accordance with the progressive count output of counter 156 as controlled from microprocessor system 88 through advance line 160. The requisite dwell timing for the filter 66 performance as earlier described is carried out by the microprocessor system 88 and utilized in regulating the evolution of advance count pulses at line 160.

To assure that the operator selects a correct combination of switching inputs as described in connection with FIG. 1, inputs are made to the microprocessor system 88 from a multiplexer 178 under the address control of a bus 180 extending from bus 98. Multiplexer 178 receives an input from line 182 to indicate to the microprocessor that a tachometer is being utilized with the apparatus 10 and will receive a logic signal level at line 184 indicating the type of transducer or probe being utilized, i.e. an accelerometer or moving coil velocity transducer form of pickup. The output of the multiplexer is shown extending to microprocessor system 88 from along line 186. Similarly, a selection of English or metric units for annotated readout is provided by a logic input to microprocessor system 88 at line 188. The input from a tachometer utilized to provide the earlier described RPM readout is shown at line 190 extending to a signal conditioner network represented by block 192 the output of which at line 194 is utilized to clock a JK flip-flop represented at block 196. The corresponding output of flip-flop 196 is present at line 198 which is directed to the serial data in input to the microprocessor system 88. Correspondingly, the reset signal from microprocessor system 88 extends along line 200 to flip-flop 196.

As indicated earlier herein, the initial lead printout occurring with the actuation of the POWER ON switch of apparatus 10 provides an indication as to whether certain microprocessor tests have been carried out to show the system to be in proper working order. One of the tests so carried out is a counter advance test in which microprocessor system 88 imposes a predetermined digital value through bus 158 to the jam inputs of counter 156. The resultant nine bit output will be present at busses 162 and 164. These busses are shown leading to the inputs of respective non-inverting three-state buffers 202 and 204 which, acting under the control of decoder 146 as exerted through lines 206 and 208, provide a corresponding numerical output at respective busses 210 and 212 which extend to and are coupled with corresponding leads of bus 86 extending to microprocessor system 88. Accordingly, at the commencement of operation of the system, a check loop is provided which inserts a binary number into counter 156 in the presence of a load command at line 154, which number is transferred via bus 86 to the microprocessor system 88. This value as well as numerical advances added thereto via command from line 160 may be compared by the microprocessor to indicate the presence of any error in the counter advancing function. In the presence of such error, the execution of the program will be seen to be halted.

The earlier described operator initiated test sequence is implemented by an oscillator which provides a 20 Hz squarewave calibrated signal, this test signal generator function being represented at block 214. The output of generator function 214 is represented at line 216 incorporating a jumper 218 and leading to a test signal input for signal conditioner 52. The jumper 218 is provided for maintenance purposes. In this regard, it may be coupled to line 220 which, in turn, is coupled to the pickup input line 50. Accordingly, the test signal derived at function 214 may be used for other calibrating purposes in the system.

Another advantageous service or maintenance feature particularly valuable in carrying out calibration procedures, involves the utilization of another jumper 222 positioned within line 80 leading to analog-to-digital converter 82. In its normal position, jumper 222 permits the imposition of an overall d.c. valve from line 62 and signal conditioner 52 into the converter 82 or, alternately, the detected filtered a.c. signal at line 76. By coupling jumper 222 between the A/D converter 82 and line 76 through line 224, function switch 32 may be bypassed to permit converter 82 to receive a filter treated signal from line 76 even though the switch provides an input to microprocessor system 88 that it is in a filter out orientation. With the maintenance operator selection of a TEST position for level switch 28 in combination with a FILTER OUT orientation for switch 32, system calibration may be carried out by appropriate manipulation of jumper 222 and assertion of a desired test frequency signal at line 50. Upon actuation of plot-advance switch 34, a calibrating output will be printed in combination with an appropriately identifying annotation. As part of this calibration test, a binary coded test frequency switch 226 is provided having an eight line bus output 228 which extends to a multiplexer 230. Multiplexer 230 is addressed for this calibration maintenance mode from along three line bus 180 and provides a selected output at line 232. Frequency switch 226 serves a variety of functions including the determination of plot rate for printer 142. Its adjustment is internal to apparatus 10. Multiplexer 230 is utilized in conjunction with binary switch 226 inasmuch as the inputs to microprocessor system are limited, thus a three line address is provided to read the switch output at bus 228 one line at a time. The output of test frequency switch 226 also will be seen to be used as a calibration factor such that with the imposition of a desired test signal at input 50, the positioning of function switch 32 in a filter-out orientation and the selection of orientation of jumper 222, a time-based test plot may be provided at a 50% scale level but with an enhanced sensitivity due to the rescaling of the output of A/D converter 82. Such an output plot permits personnel carrying out calibration procedures to calibrate selectively the signal conditioning function 52 or the filter in control network function 66 simply and with enhanced accuracy. Without such output plotting arrangement for calibration, considerable difficulties would be encountered in view of the graphical readout being essentially the only one available to the calibrating personnel.

As indicated herein, at the commencement of an analysis utilizing aparatus 10, the operator momentarily actuates switch 34 to the PLOT position. The apparatus then commences a machine cycle in accordance with the ROM contained microinstructions. Referring to FIG. 7A, such instructions are shown to commence at an entry terminal 240. The initial instructions provide for the carrying out of power on test procedures, and the operator is apprised that the apparatus is at the point in the program by the illumination of lamp 37. Accordingly, as revealed at block 241, a command is provided to turn on the test-in-progress lamp. Upon completion of this instruction, the program proceeds to carry out a check-sum test of the read-only-memory as represented at block 242. For the initial cycle, stack pointers are initialized, all output commands are nulled and appropriate other initialization procedures are carried out. The test then proceeds to obtain all bytes of information from the ROM function, carry out summing and compare for equality with the last entry within memory. Further, the correct ending address is compared. As revealed at block 243, in the event the check-sum procedure finds the ROM function in proper working order, the resultant affirmative response causes the program to perform a random access memory test as represented at block 244. The RAM test procedure also is conventional, a predetermined value or test pattern being developed as well as loaded into the memory, following which it is read back for comparison purposes. Further, a termination address evaluation is made. As represented at decision block 245, where the random access memory is determined to be in proper working order, a resultant affirmative response causes the program to progress to the performance of a counter advance test as represented at block 246. This test involves the assertion of count values representing a numerical input at the jam inputs of counter 156. This value is returned to the microprocessor system 88 for evaluation in conjunction with the assertion of advance signals from along line 160. As represented at block 246, in the event that no counter advance error is present, the instructions progress to block 248 at which position a command is made to turn off the tested progress lamp 37. Lamp 37 may be selectively energized by the simple expedient of connecting it with the SOD terminal of microprocessor system 88. The completion of a power on test procedure results in the printing of a turn on message as represented at block 249. This message may, for example read: "MICRO-P TEST OK". In the event a negative response is received with respect to either blocks 243 or 245, or an affirmative response is received in connection with decision block 247, then, as represented at terminal 250, the program execution is halted and, if desired, instructions may be given to advise the operator of a test failure condition. Assuming that the program is not halted, then, as represented at terminal 251 (PLTSM), the program proceeds to carry out a configuration control procedure.

Referring to FIG. 7B, terminal 251 again in represented now as leading to block 252 wherein an instruction to null all output commands and load a zero value into counter 156 is made. From block 252, the program proceeds to block 253 at which position all front panel test switch configurations are determined, in particular those associated with switches 28, 30 and 32. From block 253, the program progresses to decision block 254 to determine whether the operator has actuated switch 34 momentarily to the PLOT position. In the event of a negative response, as represented by loop 255, the program continues to obtain front panel switch configurations until such time as switch 34 has been actuated. With an affirmative response at block 254, then as represented at block 256, the front panel information is saved by commitment to random access memory. From block 256, the program proceeds to block 257 at which a command is given to provide a clear signal to plot mode control circuit 116 via the earlier described line 130 extending from microprocessor system 88. From block 257, the program proceeds to block 258 at which position all output commands are nulled and zero again is loaded into counter 156. From block 258, the program proceeds to decision block 259 at which position the query is made as to whether a test mode has been selected at switch 28. In the event of an affirmative response, as represented by terminal 260 (PTEST), the program proceeds to carry out a test routine. Where a test mode has not been selected at switch 28, then as represented at block 261, a command is outputted to MUX 179 to connect line 184 (VEL/ACC) to the microprocessor via line 186. From block 261, the program progresses to block 262 at which position the status of line 184 is read into the microprocessor via line 186. The status of line 184 determines whether a velocity or acceleration oriented transducer is connected to the apparatus 10. From block 262, the program proceeds to question block 263 at which position the query is made as to whether a velocity transducer is connected. In the event of a negative response, as represented at decision block 264, the query is made as to whether the unit switch 30 is set at a displacement (DISP) orientation. In the event of an affirmative response, then as represented at block 265, an error message is printed reading "IMPROPER SWITCH CONFIGURATION." In the event of an affirmative response at block 263, then as represented at block 266, the query is made as to whether the unit switch 30 is set to acceleration or "Spike Energy." In the event of an affirmative response, then as represented at block 267, an error message is printed, such switch configuration being improper for a velocity transducer connection.

In the event a negative response is received at blocks 264 or 266, the program proceeds to decision block 268 inquiring whether or not the BATT1 or BATT2 orientations have been selected in conjunction with function switch 32. An affirmative response leads to block 269 wherein an error message is printed. An error signal is provided at block 269 inasmuch as it may be recalled that the operator will have actuated switch 34 to commence a plot at this time. A negative response at block 268 leads to decision block 270 at which position a determination as to whether the FILTER OUT orientation has been selected at switch 32. This would result in utilization of the signal conditioner 52 output as presented along line 62. In the event of an affirmative response, then as represented at terminal 271, the program branches to a time plot mode. In the event of a negative response at block 270, then the query as to whether the units switch 30 is set to SE, or Spike Energy is made as represented at block 272. An affirmative response leads to the printing of an error message, as SE is available only as a time plot and not as a spectrum plot. The error message is represented as being printed via instruction at block 273. A negative response at block 272 leads to the carrying out of a spectrum form of plot as represented by terminal 274.

Figure 8C:
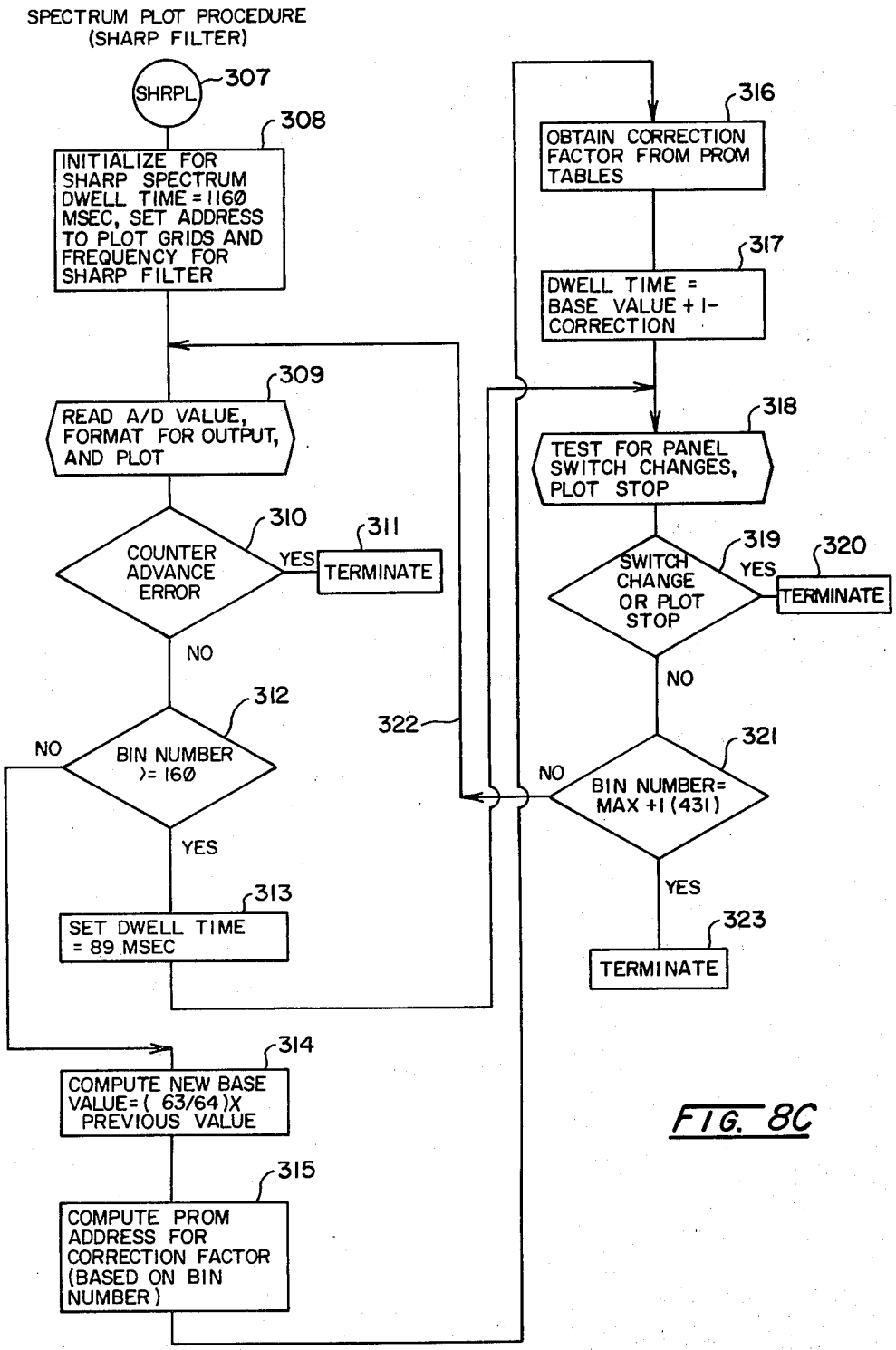

Referring to FIG. 8A, terminal 274 again is represented as the entry to the spectrum plot procedure. From terminal 274, the instructions progress to decision block 275 at which point the query is made as to whether the test position at switch 28 has been elected. In the event of an affirmative response, as represented at block 276, the command is made to print a header indicating that a test plot is at hand. In this regard reference is made the exemplary test plot at FIG. 4. In the event of a negative response at block 275, then as represented at block 277, the command is made to print a header for a normal plot output as represented in FIG. 1, the date, machine identification, position of transducer, condition of machinery, and the like being printed out for purposes of operator notation. From block 277, the program proceeds to block 278 wherein a command is outputted to MUX 178 to connect line 182 (TACH) to the microprocessor via line 186. From block 278, the program progresses to block 279 at which position the status of line 182 is read into the microprocessor via line 186. The status of line 182 determines whether a tachometer signal is connected to the apparatus 10. From block 279, the program proceeds to block 280 at which position the inquiry is made as to whether a tachometer is connected. A negative response leads as along line 291 to a command carrying out the printing of a units, filter selection, and the like information as later described. An affirmative response at block 280 leads to block 281 at which position a command is made to reset the tachometer pulse latch input as earlier described as a signal along line 200 to flip flop 196. From block 281, the program proceeds to block 282 at which position a counter identified as "loop count" is set at a value of 30,000. From block 282, the program proceeds to the command at block 283, providing for the reading of a tachometer input pulse at line 198. Following such reading, as represented at block 284, a determination of the tachometer pulse value as zero or 1 at line 198 is made. From block 284, the program proceeds to block 285 at which position tachometer latch 196 is reset via command from line 200 if a pulse has been detected. For such pulse detection, a binary count is updated as represented at block 286, whereupon the program proceeds to block 287 at which position a subroutine is carried out for continuously updating and converting the BCD count of pulses emanating from the tachometer to ASCII signals which are entered into the plot buffer of printer control 128. From block 287, the program proceeds to block 288 at which position any necessary delay to establish a 200 microsecond loop time is carried out. This 200 microsecond time component is utilized to establish an accurate development of a 6-second interval during which the tachometer information is obtained. From block 288, as represented at block 289, the earlier described loop counter is decremented and the program proceeds to decision block 290 at which position the query is made whether or not the loop counter has reached a zero valuation. In the event of a negative response, as represented at line 298, the 200 microsecond loop is repeated through the earlier noted 30,000 intervals to establish an accurate time out of 6 seconds. At this timeout, a resultant pulse count at block 287 will represent rotational speed in terms of revolutions per minute. Accordingly, an affirmative response at block 290 leads to a next query at block 300 FIG. 8B as to whether the determined RPM value is greater than 100,000, an affirmative response leading to block 301 wherein an overflow indication is provided for carrying out the printing of a series of 9s. A negative response at block 300 leads to instructions at block 302 wherein the printing of RPM, the unit selection from switch 30, bandwidth designation from switch 32 and level information from switch 28, the latter being represented as scale output. Particularly in the latter regard, the graticule pattern varies with respect to each selected such switch 28 position. From block 302, the program proceeds to block 303 wherein the command to null all output commands and load zero into counter 156 is made. Such command nulling is carried out by signal inputs to decoder 146. From block 303, the program proceeds to block 304 at which time an initialization for a spectrum plot command is provided. Additionally, an input to printer control 128 is made causing printer 144 to carry out a plot type identified as "No. 1." This command provides for the commencement of the printing of all amplitude values at a level of 50% of the maximum value. Such an arrangement permits the computation of amplitude even though an off scale printing may have occurred as described above.

Block 304 also sets the bin number at zero as well as resets all print flags. From block 304, the program then proceeds to decision block 305 at which position the query is made as to whether a broad, i.e. 10%, bandwidth has been selected at function switch 32. In the event of an affirmative response, then the program proceeds to carry out a broad filter spectrum plot procedure as represented by terminal 306. Conversely, where a sharp election has been made at switch 32, the program proceeds to carry out a sharp filter spectrum plot procedure as represented by terminal 307.

Looking to FIG. 8C, terminal 307 again is presented in conjunction with the sharp filter spectrum plot procedure. From this terminal, the program proceeds to block 308 at which position a command to initialize the system for carrying out a sharp spectrum is made. The initial bin zero dwell time is then available, such dwell time being 1168 milliseconds. Next, the addresses are set to plot grids and frequency indications for a sharp or 5% bandwidth. The program then proceeds to block 309 at which position a spectrum plot routine is carried out wherein A/D converter 82 is read and the system is formatted for carrying out an output including grids and frequency in addition to the value derived from converter 82. The procedure at block 309 also serves to advance counter 156 by 1 and to test the counter for correct value. As represented at decision block 310, in the event of a counter advance error, a termination procedure represented at block 311 is carried out. Such procedure usually being performed at the end of a given plot, three additional plots being required with an A/D converter value of zero to complete the last frequency reading. Further, a plot mode clear signal is provided.

In the event there is no counter advance error, then the program carries out a routine for computing dwell time in conjunction with a sharp filter selection. Accordingly, the program continues to decision block 312 at which point the query is made as to whether the bin number is greater than 160. This is the position at which computed dwell times for filter 66 would commence to be less than the interval required for carrying out printing at printer 144. Accordingly, where that bin number is reached, as represented at block 313, a fixed dwell time of 89 milliseconds is set. However, should the bin number be less than a value 160, then as represented at block 314, a next new base value or dwell time is computed, such computation being a multiplication of the previous value by 63/64ths. Following this computation, as represented at block 315, a computation of read only memory address is made to determine a correction factor. This correction factor is based upon the particular bin number at hand. Upon computing the address, as represented at block 316, the correction factor is obtained from the memory tables and, as represented at block 317, the dwell time then is determined as the new base value plus 1 minus the correction. By carrying out the above computations associated with blocks 314 and 315, it has been found that a conservation of read only memory capacity is realized.

The program then proceeds to carry out a routine represented by block 318 wherein the panel switches 28, 30, 32, and 34 are again examined for any changes. As represented at decision block 319, an inquiry is made as to whether any switch has been changed or whether switch 34 has been actuated into the plot position. In the event of any such change, as represented at block 320, the program is terminated in the same manner as described in connection with block 311. Where no changes is switching have been made, then the program progresses to decision block 321 wherein an inquiry is made as to whether one more than the last bin number has been reached which for the instant embodiment is number 431. Where the response is negative, then as represented by loopline 322, the program continues by reentering the instructions at block 309. Where the last bin number has been reached, as represented at block 323, a termination routine is carried out which is identical to that described in connection with block 311.

Figure 7B:
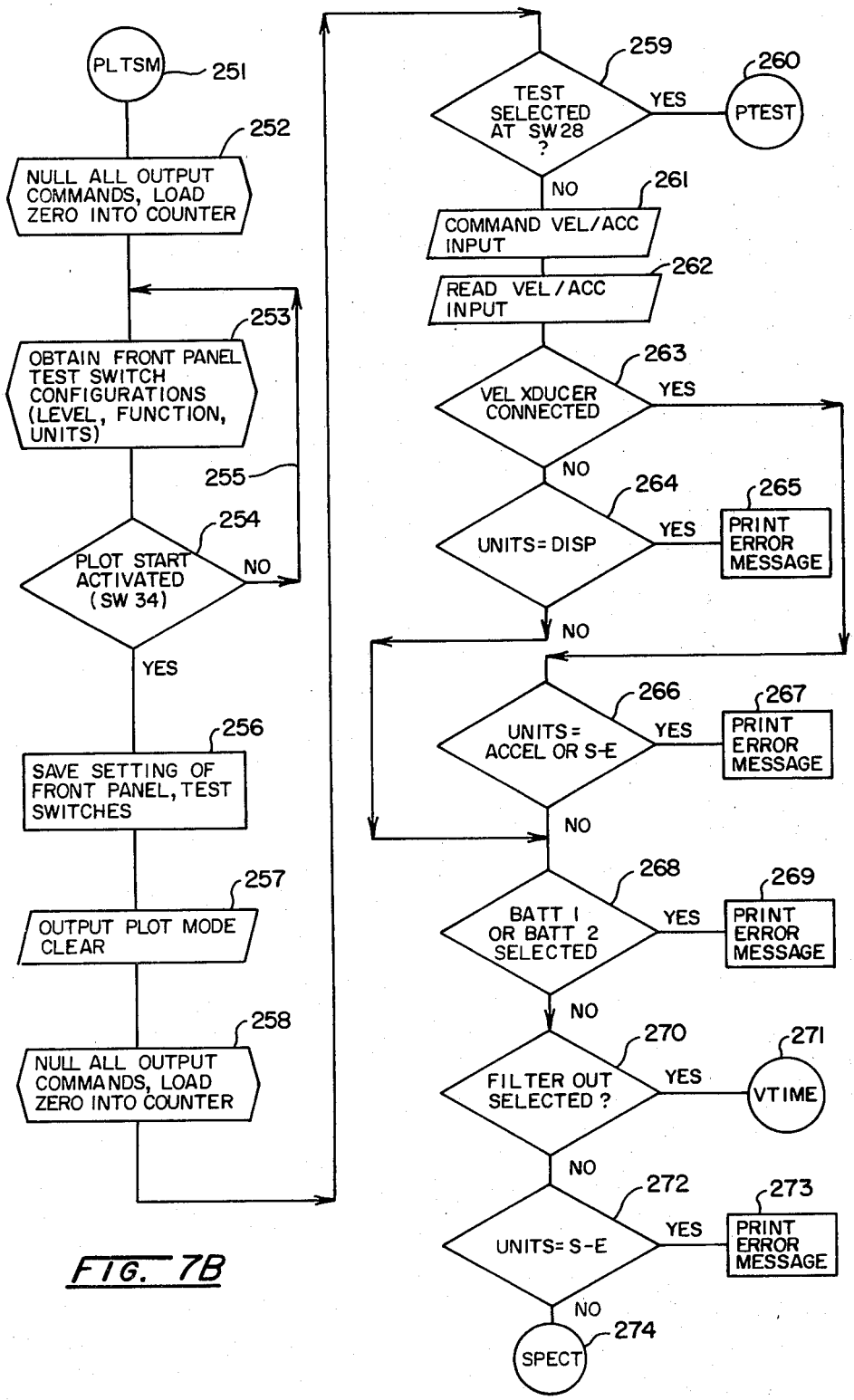

Returning to terminal 306 as shown in FIG. 8B, where the selected function at switch 32 is for a broad bandwidth operation of filter 66, a substantially identical series of microinstructions are carried out as have been described in conjunction with those blocks extending between terminal 307 and termination block 323 for the case of a sharp bandwidth. In connection with blocks 311, 320 and 323, the final step in the termination procedure is to return to terminal 251 as shown in FIG. 7B wherein preparations are made to commence the program again upon the activation of switch 34 as discussed in conjunction with block 254. The differences between the sharp and broad routines resides in the selection of an initial dwell time, for example, of 500 milliseconds instead of 1160 at the instruction corresponding with block 308 as well as the commencement of the fixed 89 millisecond dwell time at bin numbers greater or equal to bin 66 as determined in conjunction with block 312 above for the case of a sharp bandwidth approach. Similarly, the computation of dwell time is one wherein the previous base value is multiplied by 125/128 and the dwell time base value is increased by 2.

Returning to FIG. 7B, it may be recalled that a test selection decision was made at block 259. Where the answer at block 259 is in the affirmative, as represented earlier at terminal 260, the program turns to carry out a test plot procedure. Referring to FIG. 9A, the instructions representing this test procedure are shown as commencing with the same, PTEST, terminal now identified at 340. The initial instruction within the test procedure is at block 341 which provides for setting the units code for test plots. In this regard, all test plotting is carried out in a units scale of 0-1, as represented in FIG. 4. Following the setting of the scale code, the program progresses to decision block 342 wherein the query is made as to whether a broad or sharp function designation was selected. In the event of an affirmative response, then as represented by terminal 343, the program carries out a spectrum analysis which has been described earlier herein as commencing with SPECT at terminal 274. In the event of a negative response at block 342, then the program progresses to the INTPL subroutine as represented at block 344 wherein initialization for time plotting is carried out. Looking momentarily to FIG. 9B, that subroutine is revealed. The subroutine is entered as represented at terminal 345, whereupon a subroutine represented by block 346 is carried out, the subroutine providing for the printing of a plot header, RPM output, and scale output. The subroutine has been described earlier herein as incorporating blocks 275 through 302. From block 346, the subroutine progresses to block 347 at which position commands for carrying out appropriate initialization for a time plot are provided. In this regard, the types of plotting grids are elected, the elapsed time count is set to zero, the word second is not printed and appropriate plot flags are initialized. The subroutine exits as represented at terminal 348.

Turning to FIG. 9A, as represented at block 349, a next subroutine is carried out which is identified as CMDWL. This routine serves to obtain the time interval between plots and whether or not a rescaling of the A/D converter 82 is desired. The subroutine is revealed in FIG. 9C. Referring to that figure, the CMDWL subroutine is shown entered at terminal 350, whereupon, as represented at block 351, the test frequency set at 226 as shown on FIG. 5B is obtained. From block 351, a query is made at block 352 as to whether one of the frequencies so set has one of four predesignated values. These values are shown in the block in hexadecimal form and are utilized for carrying out a calibration turning of filter 66. In the event of a negative response at block 352, then as represented at block 354, the output of A/D converter 82 is expanded such that its output is more sensitive for purposes of calibration. In this regard, the full scale value of the converter, for example 160, is subtracted from the entering signal and an arbitrary value, for example 50, is added to the resultant sum. This provides a highly desirable printout for calibration. Considering block 354 of FIG. 9C, note that through the use of jumper 222 coupled to line 224 (FIG. 5B), the instant highly sensitive A/D output may be utilized with test inputs deriving from filter 66.

From block 354, the subroutine progresses to block 355 where default times for a time plot or test plot are provided in the event no predesignated test frequency values are set at test frequency switch 226. In the event of an affirmative response at block 352, then as represented at block 353, a flag is set to plot an A/D value normally for a test plot. From block 353, or from block 355 the instructions proceed to block 365 at which point dwell times for delay are obtained from memory table values. Following this acquisition, as represented at block 357, the total period between plots, designated "delta," is computed and this is the obtained dwell time increased by 2. The subroutine then is exited as represented at terminal 358.

Returning to FIG. 9A, the program then progresses to block 359 at which position the query is made as to whether the test switch 226 value is above a predetermined maximum. In the event that is the case, then as represented at block 360, the program is terminated as described earlier at block 311. Where the test switch value is not above a maximum value, then as represented at block 361, counter 156 is loaded with the test switch value and, as represented at terminal 362, the test plot procedure continues as represented by the same TPLOT terminal designation 363 at FIG. 9D. Looking to that figure, as represented at block 380, a delay is carried out for permitting the reading of A/D converter 82, following which, as represented at block 381, the A/D value generated at converter 82 is read. Following such reading, the program proceeds to decision block 382 wherein a query is made as to whether the A/D value should be rescaled as discussed in conjunction with block 354 in FIG. 9C. Where the flag was set at that instruction to rescale, then as represented at block 383, rescaling is carried out. Following such rescaling, or, as represented by line 384, the program then proceeds to block 385 wherein instructions for formatting for grid lines and print in terms of seconds is provided.

Following such formatting procedures, as represented at block 386, the output is plotted. The program then continues to decision block 387 at which position a query is made as to whether any changes have been made to the panel switches 28-30, 32 or whether switch 34 was actuated to carry out a stop procedure. In the event of an affirmative response, as represented at block 388, the program is terminated in the manner described earlier in conjunction with block 311. In the event of a negative response at block 387, then as represented at block 389, a query is made as to whether any changes have been made to the value established at test frequency switch 226. A negative response leads to a reentry at terminal 363 as represented by line 390, and an affirmative response leads to terminal 391 which returns the program to corresponding block 392 in FIG. 9A. Thus, maintenance personnel are afforded the opportunity of making adjustments to switch 226 and having the program immediately respond with altered plot outputs.

Figure 10:
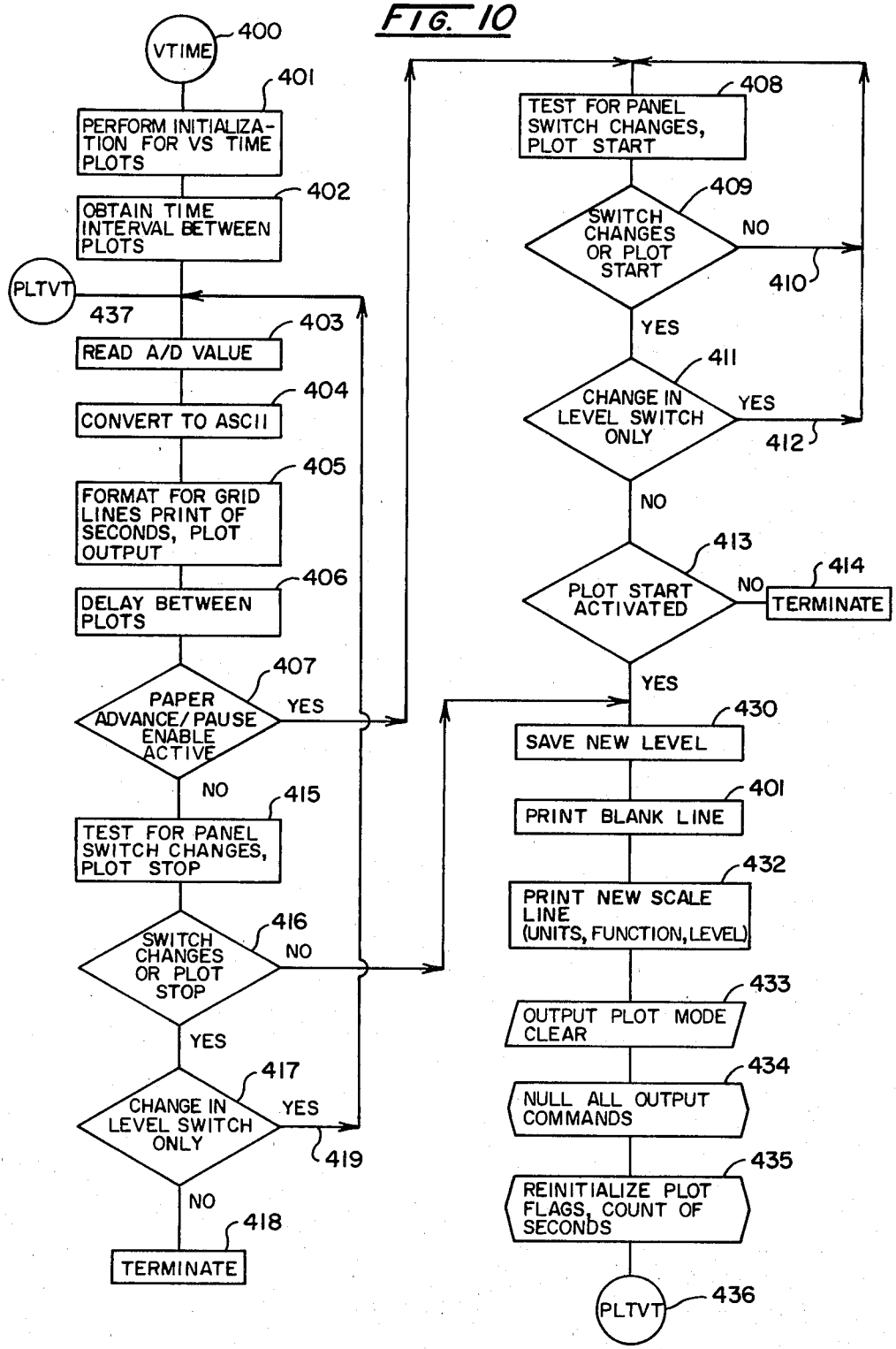
FIG. 10 is a flow chart showing the microinstructions utilized in developing a time-based, filter-out mode plot using the apparatus of the invention.

Returning to FIG. 7B, where the query at block 270 represents that the filter out position has been selected for panel switch 32, then as represented at terminal 271, the program enters a filter out mode time plot as represented by terminal 271. This terminal, labeled VTIME, is represented at corresponding terminal 400 in FIG. 10. Referring to that figure, the filter out mode time plot commences as represented at block 401 with initialization of the system. Following such initialization, as represented at block 402, the time interval intermediate each of the plots is obtained and the program proceeds to block 403 at which position the A/D value derived at converter 82 is read. As represented at block 404, this value then is converted to ASCII signals for utilization at printer control 128 and printer 144. From block 404, the program progresses to block 405 at which point a formatting for grid lines and print out of seconds is carried out and a first output is plotted, i.e. a line is printed. From block 405, as represented at block 406, a delay between successive plots is established. Following the delay at block 406, as represented at decision block 407, a query is made as to whether switch 34 has been actuated to its ADVANCE/PAUSE orientation by the operator. This query enables the system to carry out a form of pause operation, an affirmative response at block 407 leading to block 408 at which position the test is carried out to determine whether any changes have been made in switches 28, 30, 32, or whether switch 34 has again been actuated to its PLOT or START orientation. Accordingly, as represented at block 409, a query then is made as to whether any such switch changes have been made. In the event of a negative response, then as represented by line 410, the routine loops and awaits such a switch change or the removal of the signals generated to derive an affirmative response at block 407. Where the response at decision block 409 is in the affirmative to represent a switch change or a movement of switch 34 to the plot position, then as represented at block 411, the query is made as to whether the change was one of level at switch 28. In the event of an affirmative response, as represented at line 412, the routine again loops until a change is effected in the response at block 407. Where a change in level switch only is not at hand, then as represented at block 413, the query is made as to whether switch 34 has been moved to the PLOT position. If it has not been so moved, then as represented at block 414, the cycle is terminated in the manner described earlier in connection with block 311. Thus, it may be seen that where only a change is made in level at switch 28, the system will pause and await the movement of switch 34 momentarily into the PLOT orientation. However, for any other switch changes made, then cycle termination is carried out.

Returning to decision block 407, in the event that switch 34 has not been actuated to the ADVANCE position, then as represented at block 415, at test is carried out to determine whether any of the noted panel switches has been changed or whether switch 34 has been moved to the opposite or PLOT position. The program then proceeds to decision block 416 to determine whether any of the above switch changes have been made. In the event of an affirmative response, as represented at block 417, the inquiry is made as to whether the change was made only in level at switch 28. A negative response to this inquiry leads to termination of the cycle as represented at block 418, which block, as before, carries out the functions as described in connection with block 311. An affirmative response at block 417 leads, as represented by line 419, to the reading of A/D values as represented at block 403, and the plot continues at a new level value. Such changes may, for example, appear in the printout as shown earlier in conjunction with FIGS. 3A-3C.

Where the inquiry at block 416 is in the negative, or the inquiry at block 413 is in the affirmative, then the program proceeds to block 430 wherein any new level is saved, whereupon, as represented at block 431, a blank line is printed. Following this skipping procedure, the program progresses to block 432 at which position a new scale line including identification of units function and level arrangement is provided. From block 432, the program proceeds to block 433, wherein a clear signal is presented along line 130 to plot mode control 116 (FIG. 5B). From block 433, the program proceeds to block 434 wherein the command to null all output commands is made, following which, at block 435, all plot flags are reinitialized and the program proceeds to terminal 436, identified as PLTVT. As represented at terminal 437, when the program reaches this stage, the A/D value again is read as represented at block 403, and the filter out mode plot continues.

A characteristic of the step voltage tuned filter 66 having a constant Q value resides in the requirement for providing an adequate dwell time for each amplitude defining step or line across the plot. Conventionally, such dwell times are selected as corresponding with the reciprocal of bandwidth and as a consequence, dwell intervals of up to as much as two seconds between lines at lower frequencies might be expected. With the instant invention, however, the dwell intervals are minimized to correspondingly lower the entire interval required for plotting over the full available frequency spectrum. Of course, the dwell intervals must be of duration sufficient to permit adequate printer performance, a typical minimum plotting time being about 100 ms.

Looking to FIG. 6, curves representing dynamic bandwidths for various dwell times are represented, the structuring of the curve being based upon a steady state analysis. The lower abscissa scale of the curves represents normalized bandwidth, i.e. bandwidth being shown extending outwardly in both a positive and negative direction in terms of 20% values. Correspondingly, the upper abscissa scale shows the percentage of center frequency normalized to a center frequency value of 1.0. Thus developed, the curves also are normalized to the time constant of a representative filter and show, as the dwell interval diminishes, that the selectivity of the filter tends to worsen. Looking to curve 40, a normalized curve computed as $\alpha t = \pi/4$, shows a short dwell interval wherein t is equivalent to dwell interval and alpha is the reciprocal of the noted time constant. Artifacts in filter response are in evidence as well as a less than desirable selectivity. Similarly, curve 42 shows the effect of doubling the dwell interval represented by curve 40 and, while improvement in selectivity is represented, artifacts in filter response still are present. Curve 44 represents a doubling of the time interval utilized in curve 42 and shows an adequate selectivity representing about 96% of best possible response. In the latter regard, curve 46 represents about a 99.8% performance selectivity. Where this conventional form of dwell time analysis is utilized, the initial frequency dwell intervals per filter step for a filter Q of about 20 will require about two seconds dwell time. This dwell time, of course, will considerably lessen as frequencies are increased along the spectral plot. The curves of FIG. 6, however, do show the importance of providing an adequate dwell time at each incremental step in plotting the frequency and amplitude curves utilized in vibration analysis. However, in accordance with the instant invention, the sweep rate may be increased considerably to improve total sytem performance. Considering the filter dwell time anaylsis on a continuous basis, the dwell interval or dwell time, $\Delta t$ may be expressed as follows:

$$\Delta t = 1/\Delta f \quad (1)$$

Thus, dwell time is essentially the reciprocal of bandwidth.

Letting $\Delta f$ represent the inherent or fundamental resolution of the filter, the following relationship obtains:

$$\Delta f \rightarrow df = f/Q, \quad (2)$$

and then defining dwell time as a differential time and considering a high Q filter, the following relationship obtains:

$$dt \rightarrow 1/\Delta f \rightarrow Q/f. \quad (3)$$

By defining the ratio of the differential element of frequency and the differential element of time in terms of Q and f, the following relationships may be provided:

$$df/dt = f/Q \cdot f/Q \leq f^2/Q^2 \quad (4)$$

Considering the reciprocal of (4) above;

$$dt/df \geq Q^2/f^2 \quad (5)$$

The differential dwell time may be considered as:

$$dt \geq Q^2 \frac{df}{f^2} \quad (6)$$

An interval may be defined between two points of time, $t_1$ and $t_2$ as follows:

$$[t_2 - t_1] = \int_{t_1}^{t_2} dt\, Q^2 \int_{f_1}^{f_2} df/f^2 \quad (7)$$

Now considering the step increments in frequencies at hand and defining them by the frequencies, $f_2$ and $f_1$ such that:

$$f_2 = f_1(1+K), \quad (8)$$

where K is a constant representing a fraction of center frequency, the time interval between stops may be derived as follows:

$$[t_2 - t_1]Q^2 \int_{f_1}^{f_2} df/f^2 = -Q^2[1/f_2 - 1/f_1] \quad (9)$$

$$[t_2 - t_1] = Q^2[(f_2 - f_1)/f_1 f_2] \quad (10)$$

and since from (8) above $$f_2 = f_1(1+K) \quad (11)$$

substituting (11) into (10):

$$[t_2 - t_1] = Q^2(f_1(1+K) - f_1)/f_1^2(1+K) = KQ^2/(1+K)f_1 \quad (12)$$

Thus, the time interval between frequencies $f_2$ and $f_1$ becomes $$[t_2 - t_1] \geq KQ^2/(1+K)f_1 \quad (13)$$

Expression (13) is one which considers an ideal continuous tuning across the frequency spectrum at hand. Thus, the expression represents the minimum dwell time which can be required of the filter 66. However, filter 66 is tuned on a stepwise basis, the number of steps initially being chosen to achieve a histographic readout representing a readily readable analog profile of the frequency spectrum. The number of steps which may be designated, n, wherein n is any positive number and not necessarily an integer, has been shown to vary with respect to the BOARD or SHARP bandwidth selected by the operator at function switch 32. Thus, for SHARP selection, 3.0875 steps are carried out per 3 dbBW, while when apparatus 10 is in a BOARD bandwidth selection mode, 3.772 steps are involved per 3 dbBW. Where, instead of continuous tuning, such discrete steps are utilized, a transient will be evolved which will diminish toward zero as the value n approaches infinity. Now, considering the effect of such a stepped tuning transient, the following considerations obtain:

The transfer function of a bandpass filter in the region near resonant frequency, $f_0$, can be approximated by the expression:

$$H(\delta) = 1/(1+2jQ\delta), \quad (14)$$

where $\delta$ is the normalized tuning increment from the resonant frequency and is given by:

$$\delta = (f-f_0)/f_0, \quad (15)$$

f being the "present" frequency.

The absolute magnitude of $H(\delta)$ may be represented as follows:

$$|H(\delta)| = 1/\sqrt{1+4Q^2\delta^2}, \quad (16)$$

and the rate of change of normalized frequency may be derived by differentiating the above magnitude as follows:

$$d|H(\delta)|/d\delta = -\tfrac{1}{2}[1 + 4Q^2\delta^2]^{-3/2} 8Q^2\delta \quad (17)$$

$$= -4Q^2\delta/[1 + 4Q^2\delta^2]^{3/2} \quad (18)$$

Under the instant step tuning conditions, a transient may be triggered which is equal in magnitude to the difference in the steady state responses of the filter at two discrete tuning points on the tuning curve. The amplitude of this transient, $A_t$, may be approximated as follows:

$$A_t = d|H(\delta)|/d\delta \cdot [\delta] A_{sig}, \quad (19)$$

the expression representing a multiplication of the change of magnitude with the increment by the increment followed by a scaling of that expression to the signal amplitude, $A_{sig}$. Recall that the transient amplitude, $A_t$, vanishes for the above-discussed continuous tuning case as $\delta$ becomes vanishingly small.

Assuming $\delta$ to be a tuning increment spaced from peak position, for the instant embodiment, this will correspond to the division of 3 db bandwidth by n where, as noted above, n is the number of step positions per 3 db bandwidth. Thus:

$$\delta = f_0/nQf_0 = 1/nQ \quad (20)$$

Placing expression (20) into an absolute valuation for expression (19), the following expression occur:

$$|A_t| = 4Q^2(1/n^2Q^2)A_{sig}/[1+4Q^2(1/n^2Q^2)]^{3/2} \quad (21)$$

$$|A_t| = (4/n^2)A_{sig}/[1+4/n^2]^{3/2} \quad (22)$$

Assuming, for the instant embodiment that a SHARP FILTER designation has been selected, n will equal 3.0875, which when substituted in expression (22) above provides a transient amplitude of 0.248 $A_{sig}$. Recalling from FIG. 6 that a time constant of $\pi$ is desirable, this will decay to 0.04 $A_{sig}$ in 1.82 time constants. The corresponding dwell time required at 10 Hz and for a Q of 20 becomes 1.16 seconds. For a BROAD bandwidth designation, n will equal 3.772 for which, at 10 Hz and for a Q=10, the dwell interval becomes 0.502 seconds. Further considering the instant preferred embodiment, 430 bins or increments are selected for the SHARP bandwidth designation. Assuming further that the minimum plot time is 0.1 seconds, for carrying out a SHARP or 5% bandwidth frequency spectrum analysis, 65.4 seconds are required for the first 153 bins, while the remaining 277 bins will have a dwell time determined by the minimum plot time of printer 144. The total readout time then becomes 93.1 seconds. Assuming that 264 increments or bins are available in the BROAD designation, the above-computed dwell time will obtain for the first 62 bins requiring 15.7 seconds of dwell interval. The remaining 208 increments are determined by printer 144 plotting time to result in a total spectrum analysis plot time of 35.9 seconds. Thus, with the analysis instrument of the invention, considerably enhanced total frequency spectrum plot intervals are evolved to permit more efficient operator time utilization.

Figure 12A:
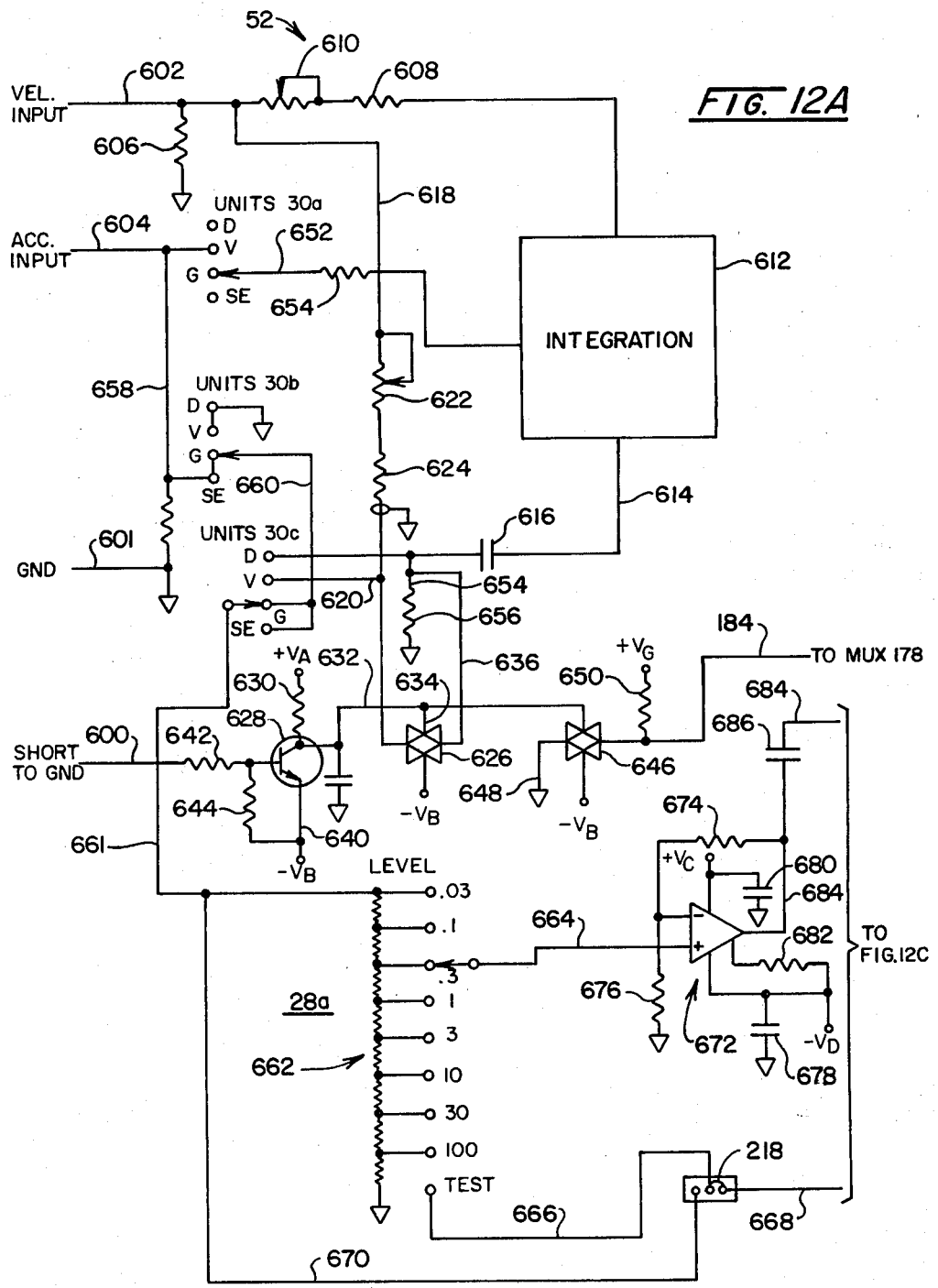

Referring to FIG. 11, the proper positioning of FIGS. 12A–12C is diagrammatically revealed. Looking to the latter figure combination, circuit components of the apparatus 10 described in general in conjunction with block 52 of FIG. 5A are revealed at an enhanced level of detail. In these figures, the switches represented in general at 28, 30 and 32 are represented having multiple decks and, thus, are designated alphanumerically while retaining the same general numerical designations provided for in connection with FIG. 1.

As indicated earlier herein, the apparatus 10 may, for example, operate with different forms of transducers or pickups. In FIG. 12A, multiple inputs 600–602 are provided for connecting a velocity type transducer with the apparatus, while input line 604 is provided for connection with an accelerometer type transducer, for example, of the piezoelectric variety. Looking initially to a velocity type transducer input, a coupling of such transducer through connector 12 will carry out the shorting of line 600 to ground at line 601. Additionally, the velocity related a.c. signal derived from the transducer will be imposed at line 602. Assuming further that the operator has manipulated unit switch 30 to an orientation calling for displacement, the indicated switch arm in corresponding switching decks 30a–30d will be coupled to the "D" terminal.

Line 602 includes impedance matching resistors 606 and 608 as well as a calibrating potentiometer 610 and is shown leading to a conventional single integration stage represented at block 612. The resultant output of integration stage 612 at line 614 is representative of displacement and is directed across d.c. blocking capacitor 616 to the displacement output, D, of unit switch deck 30c. In the event that the operator has elected a velocity readout, switch 30 will be oriented accordingly and the switch arm at switch decks 30a–30d will be at the V position. With such an arrangement, integration is not carried out and the velocity related signal at line 602 is directed along lines 618 and 620 to the V position terminal of switching deck 30c. Line 618 includes a calibrating potentiometer 622 and limiting resistor 624.

Line 620 is shown extending to a DMOS analog switch 626 which, in turn, is controlled in correspondence with the state of a PNP transistor 628. The collector of transistor 628 is coupled through resistor 630 to $+V_A$ power supply as well as along lines 632 and 634 to the switching terminal of switch 626. With the arrangement, a high logic level at line 632 will cause switch 626 to turn "on" permitting conduction from line 636 to line 620. The emitter of transistor 628 is coupled along line 640 to negative voltage supply, $-V_B$ and the base thereof is coupled to line 600. A voltage dividing network including resistors 642 and 644 is associated between the base and emitter of transistor 628 such that, when line 600 is shorted to ground at line 601, the base becomes positive with respect to the emitter and the transistor is turned on. This causes a logic low to be present at line 632 to effect the turning off of switch 626.

Line 632 additionally extends to the control terminal of a second DMOS analog switch 646 which serves to control the logic level of line 184. In this regard, one terminal of switch 646 is coupled through line 648 to ground, while the opposite controlled terminal thereof is coupled to line 184, which, in turn, is coupled through resistor 650 to $+V_G$ voltage supply. As described in connection with FIG. 6B, line 184 provides a signal input to the microprocessor identifying the type of transducer which is coupled with the apparatus 10. A logic high level at line 184 represents a velocity form of input, while a logic low represents an accelerometer form of transducer connection.

Assuming now that an accelerometer form of transducer has been connected with apparatus 10 through connector 12, a resultant acceleration responsive signal will be provided at line 604. Should switch 30 be oriented for a velocity readout, the arm at switch 30a will be at the V position and the signal at line 604 will be asserted along line 652 including resistor 654 to integration stage 612. Within stage 612, the accelerative signal is integrated to provide a velocity characterized signal at output line 614. Line 614 is coupled, in turn, to line 654 which leads through resistor 656 to ground and which, additionally, is connected to line 636. Inasmuch as line 600 is not shorted to ground with the utilization of an accelerative type input, transistor 628 is in an off condition and switches 626 and 646 are turned on. Accordingly, the velocity characterized signal at line 614 is passed along line 636, through switch 626 and to line 620 which is coupled to the velocity, V, terminal of switch 30. As indicated above, the on condition of switch 646 as developed by the high logic level of line 632 provides an appropriate logic low value at line 184 for purposes of identifying the accelerometer type pickup to the microprocessor system 88.

In the event the operator has positioned unit switch 30 to either an acceleration orientation or "Spike Energy" one, then the signal at line 604 will be directed along line 658 to the G and SE terminals of unit switch deck 30b. The switch arm of switch deck 30b is coupled along line 660 to the corresponding G and SE terminals of units switch deck 30c. From units switch deck 30c all signals, whether treated or otherwise and represented by the terminal designations, D, V, G or SE, are transferred to line 661 which, in turn, leads to deck 28a of level switch 28. Line 661 is coupled to one end of a series configuration of tapped resistors represented generally at 662 which, in dependence upon the arm position of the switch, provides a conventional scaling function. In this regard, the switch arm at deck 28a is coupled to line 664 which, in turn, leads to a series of amplification stages.

Positioned beneath the array of tapped resistors 662 is a test position terminal for level switch 28a. This terminal is coupled by line 666 to one side of earlier described jumper 218. The opposite side of jumper 218 is coupled by line 668 to the output of a test signal oscillator which serves to provide the earlier described 20 Hz squarewave output. Accordingly, with the arm of switch deck 28a at the test terminal, the test signal may be applied through lines 668 and 666 directly to line 664. By appropriate manipulation of the jumper at 218, the test signal also may be replaced by an external calibration signal through line 670. As indicated earlier herein such an alternative arrangement enhances the capabilities for testing and calibrating apparatus 10.

Line 664 is shown coupled to the positive input of an amplification stage 672 present as an operational amplifier connected having a feedback resistor 674 which, as associated with resistor 676, provides a predetermined gain. Bypass capacitors 678 and 680 combine with programming resistor 682 to cause the amplification stage 672 to operate in proper mode. The output of stage 672 is present at line 684 which includes a coupling capacitor 686 and extends to the input of another amplification stage 688. A bypass resistor 690 is coupled between line 684 and ground for operation in conjunction with capacitor 686. Incorporating an operational amplifier, the gain of stage 688 is established by resistors 692 and 694, while its operational mode is assured through the utilization of bypass capacitors 696 and 698. The output of amplification stage 688 is present at line 700 and is directed to the positive input of another amplification stage represented generally at 702. Incorporating an operational amplifier and having a gain determined by feedback divider resistors 704 and 706 as well as a calibrating potentiometer 708, the output of stage 702 is present at line 710. Potentiometer 708 serves the function of providing a calibrating feature for use in conjunction with the acceleration parameter. The output of amplification state 702 extends to three distinct functions. For example, line 712 is coupled to output line 710 and thence to line 64 for introduction to the earlier described filter and control network 66. Line 712 also extends to a "Spike Energy" detector network 714. Network 714 serves to detect bursts of energy generally found in the ultrasonic range and which have been found to be associated with defective bearings and worn gears. Such networks are available in the marketplace, for example, as a Model 810 Detector marketed by IRD Mechanalysis, Inc., Columbus, Ohio. Generally, the output of an acceleration type transducer is utilized in conjunction with networks as at 714. The output of network 714 is present at line 716 and is directed to unit switch deck 30d at the terminal labeled "SE."

Output line 710 of amplification stage 702 also is directed through line 718 including coupling capacitor 720 and bypass resistor 722 to one input of an RMS-D.C. converter 724. Converter 724 may, for example, be present as a type AD536J marketed by Analog Devices, Inc., Norwood, Mass. The resultant d.c. output of converter 724 is present at line 726 and is directed to a common connection with the displacement, D, velocity, V, and acceleration, G, terminals of switch deck 30d. In conventional fashion, converter 724 is configured including mode defining capacitors 728 and resistor 730. The network provides an output which is a d.c. level corresponding with the RMS signal asserted thereto from line 718. This signal at line 726 is used in conjunction with the FILTER OUT orientation of function switch 32 and is plotted on a time scale in the manner represented by the plots of FIGS. 3A-3C.

The d.c. type signal at line 726 as well as the "Spike Energy" signal at line 716 are treated by an interactive combination of UNITS switch deck 30d and FUNCTION switch decks 32b and 32c. In this regard, switch arm 732 may be positioned at any one of the displacement, velocity, acceleration or "Spike Energy" terminals identified respectively as: D, V, G and SE whereupon the output thereof is detectable by function switch deck 32b switch arm 734 when positioned at the FILTER OUT orientation identified as "FO." Arm 734 is seen to be coupled by line 738 and earlier described jumper 222 to line 80 which is directed to analog-to-digital converter network 82. Where jumper 222 is moved to its alternate position, the signal derived from detector network 74 may be applied to converter network 82 when function switch 32 is in a FILTER OUT orientation.

Units switch deck 30d arm 732 also is coupled through resistors 740 and 742 to the terminals of function switch deck 32c. This switch deck is associated with the operation of earlier described analog meter 20 and is represented in FIG. 12C at 20'. In this regard, note that the arm 744 of the switch deck 32c extends through a calibrating potentiometer 746 to the input of the meter. By selecting a FILTER OUT, FILTER BROAD, or FILTER SHARP as represented respectively at FO, FB and FS, a corresponding reading of the d.c. level is provided at the meter. Additionally, a battery check is available with the function switch. In this regard, lines 748 and 750 extend from the respective 6 v and 12 v battery supply outputs to corresponding terminals for battery check readings at meter 20. A clamping diode 752 is shown coupled from a position between resistor 740 and 742 to ground and serves the conventional purpose of preventing meter overload.

Looking to FIG. 12B, an encoding function of function switch deck 32a is revealed. In this regard, switch arm 754 is shown being positionable for contact with a filter out, FO, terminal which is coupled through line 756 and 758 to ground. Line 758 also extends to the sharp filter position, FS, of the switch deck. Accordingly, arm 754, being coupled to line 70, asserts a low logic level to filter network 66 when the operator has selected a filter out or sharp bandwidth filter position. On the other hand, the broad filter selection at terminal FB is coupled through line 760 to +5 v. Thus, when arm 754 is at the FB position, a logic high is asserted at filter network 66 through line 70.

Level switch 28, unit switch 30 and function switch 32 also carry out a position identification signalling function for apprising microprocessor system 88 of the switch positions which the operator has elected. The logic provided to microprocessor system 88 is one represented by binary signals generated in connection with the number of switch orientations involved. For example, the logic output representing level switch 28b is shown generally at block 28b. The output of this switch represents a three line coded binary signal corresponding with one of the eight scaling positions of the switch. These lines are represented extending from block 28b at lines 762-764. The test condition output signal for the switch is represented at line 766. Switch function 28b also provides an on-off signal at line 768 which serves to activate the test signal oscillator network 214 (FIG. 12C) when the TEST position for level switch 28 is selected.

Similarly, unit switch 30 is configured having a possible four outputs and the information as to which of these outputs has been selected is generated by a switching function represented at block 30e. The output of function 30e is represented at lines 770 and 771 and represents a binary coded signal to microprocessor system 88 as to the selection of one of the four unit orientations on the part of the operator.

Finally, function switch 32 is represented at block 32d as having two output lines 772 and 773 carrying a binary coded signal as to switch positions associated therewith. For this switch function, the BATT 1 and BATT 2 positions are common with respect to information supplied to the microprocessor system 88.

FIG. 12B also reveals the presence of two active filters represented generally at 774 and 776. These filters serve the function of providing voltage levels of high quality as represented at $V_A$-$V_F$ which are used at various indicated positions by the highly sensitive circuitry represented in FIGS. 12A-12C. Filter 776 is shown receiving a +15 v power input from line 778 and a ground input from line 780, while the latter line also extends to filter 774 in conjunction with a −15 v power supply input at line 782. These power inputs are shown derived from a power supply function represented by block 784 in FIG. 13. Block 784 is coupled to receive battery supply inputs of 6 v and 12 v values to provide the noted ±15 v outputs as well as a 2.5 v output and a 5 v output.

Figure 14:
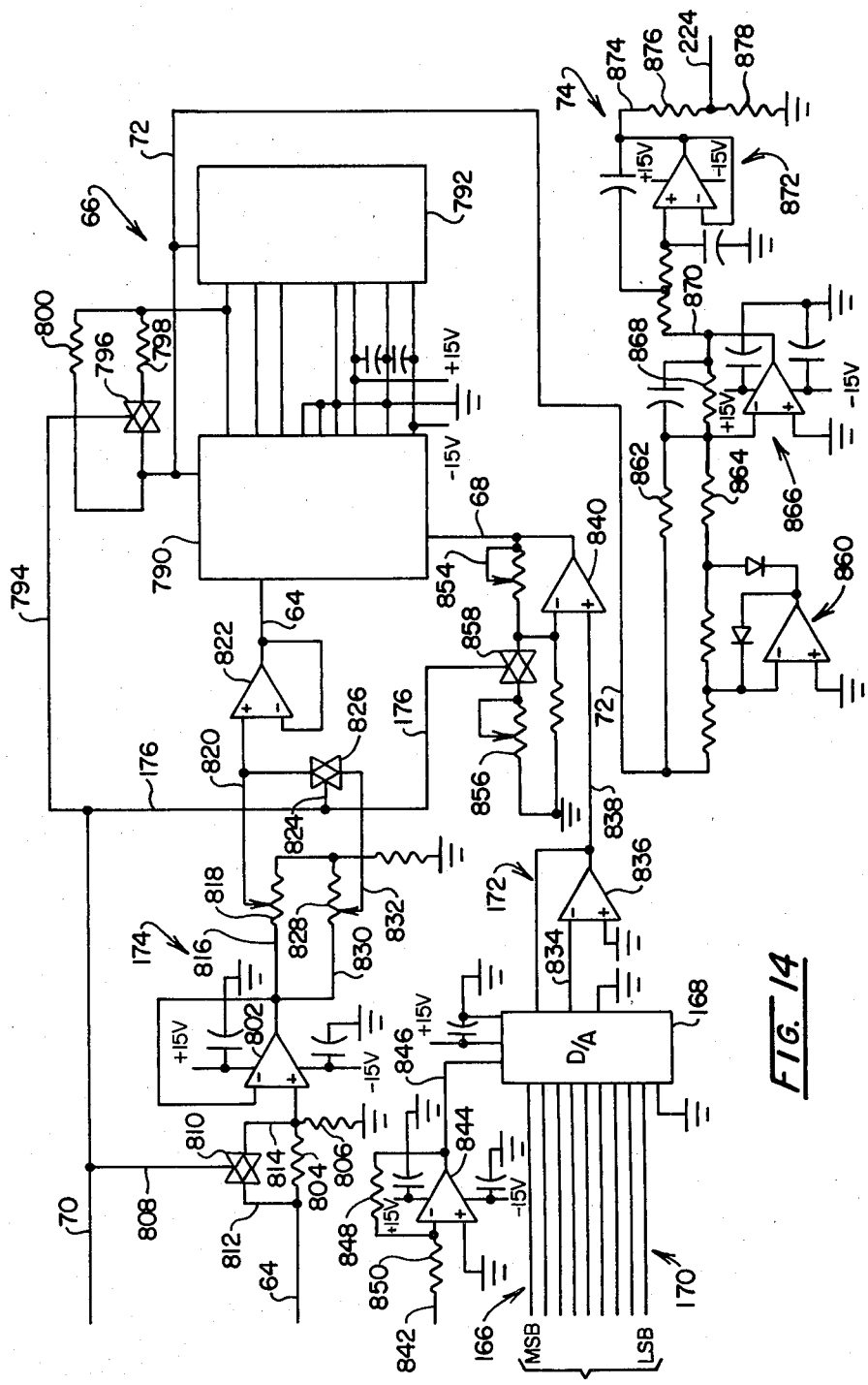
FIG. 14 is a circuit diagram showing components of a voltage tuned filter arrangement and detector network utilized with the control circuit of the invention.

Referring to FIG. 14, the components of apparatus 10 representing a version of the voltage tuned filter network 66 and the controls associated therewith, as well as detector network 74 are revealed in enhanced detail. The filter within loop 66 includes a control module 792 which is operatively associated with a filter module 790. The inputs to the filter, as described in conjunction with FIGS. 5A and 12B and 12C, include an overall a.c. signal from line 64, a d.c. level tuning input at line 68 and a bandwidth mode select input which emanates from line 70. Looking to line 70, this line has been described in connection with FIG. 12B as providing a broad or sharp filter selection designation, a high logic value representing a broad or 10% bandwidth selection, while a logic low level represents a sharp or 5% bandwidth selection. Line 70 is shown coupled through line 794 to the control terminal of an analog switch 796. The logic level at line 794 provides for an external selection of Q value for filter network 66. In this regard, where the broad bandwidth is selected, a Q of value 10 is desired. Switch 796 responds to a high logic level to conduct and effect the combination of resistors 798 and 800 to cause filter 66 to operate at the noted Q level. Conversely, with a logic low at line 794 representing a sharp or 5% bandwidth, switch 796 is off and resistor 800 provides, for example, for the operation of filter 66 at a Q of 20.

The overall a.c. signal to be filtered is, as earlier described, presented along line 64, whereupon it is introduced to a scaling amplification stage as described earlier at block 174 and present as an operational amplifier 802. The gain of amplifier 802 is determined by the values of resistance of divider resistors 804 and 806 and varies with respect to the logic level at line 70. In this regard, line 808 is shown connected between the control terminal of analog switch 810 which is coupled in shunt by lines 812 and 814 about resistor 804. Thus, with the selection of a broad bandwidth, the resultant logic high at line 808 turns on switch 810 to effect a bypassing of resistor 804. Conversely, resistor 804 remains effective in determining gain of amplifier 802 in the presence of a logic low at line 808 and a consequent off condition switch 810. The output of scaling amplifier 802 is present at line 816 which is coupled through a calibrating potentiometer 818, the arm of which is connected via line 820 to one input of a buffer amplification stage 822. The output of buffer 822 is present as the earlier described line 64 which is coupled into the filter module 790 of filter network 66.

When the function switch 32 is adjusted to elect a broad or 10% bandwidth analysis, the resultant high logic level at line 176 additionally is asserted through line 824 to the control terminal of an analog switch 826. Assuming an "on" condition in the presence of a high logic level at line 824 representing a broad bandwidth selection, switch 826 effects the enablement of calibrating potentiometer 828 within line 830. In this regard, the wiper arm of potentiometer 828 is coupled through line 832 containing switch 826 to input line 820 leading to buffer 822.

As described in connection with FIGS. 5A and 5B, the tuning of filter network 66 is carried out in stepwise fashion in conjunction with a nine-bit numerical input asserted at digital-to-analog converter 168 from counter 156. The digital-to-analog converter again is represented in FIG. 14 at 168 and may be present, for example, as a Type AD7520 marketed by Analog Devices, Inc. of Norwood, Mass. Note that the nine leads represented by busses 166 and 170 are represented as nine discrete lines leading to converter 168 and the output thereof at line 834 is provided at one input to an operational amplification stage 836, the output of which leads along line 838 to the input of a second operational amplification stage operating as a non-inverting scaling amplifier and identified at 840.

Figure 13:
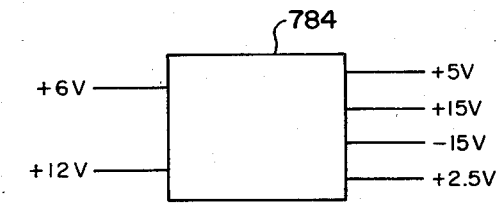
FIG. 13 is a block schematic representation of a power supply utilized with the circuit of the invention.

Converter 168 necessarily operates with a carefully regulated reference voltage input, which input is initially derived from the 2.5 v output of power supply function 784 as described in FIG. 13. This 2.5 v reference input is shown extending along line 842 to one input of an amplification stage 844, the output of which is asserted from along line 846 to the reference voltage input of converter 168. The voltage level at line 846 is adjusted with respect to the requirements of converter 168 and is established by selection of the resistance values for resistors 848 and 850.

Scaling amplification stage 840 is configured having an output at line 68 leading into the filter module 790 of filter network 66. This output is trimmed or calibrated by the adjustment of the wiper arms of potentiometers 854 and 856. Because the scaling factor will vary between a broad bandwidth analysis and a sharp bandwidth analysis, an analog switch is shown at 858 having its control terminal coupled to filter model select line 176. Thus, when a broad bandwidth is at hand, switch 858 is in an "on" condition and the adjustment effected at potentiometer 856 will influence the gain of amplification stage 840. Conversely, in the event of a low logic level at line 176, only potentiometer 854 will influence the scaling factor of the progressively increasing signal at line 68. Recall that, for example, this signal will vary from 0 to 10 v d.c. in correspondence with a frequency alteration in stepwise fashion from 10 Hz to 10 KHz.

The output of filter stage 66 at line 72 is directed, as indicated earlier, to a peak detector network 74. Network 74 is revealed in more detail in FIG. 14 and includes a first operational amplifier stage 860 which serves to develop a precision halfwave rectified output which is summed with the unrectified signal. In the latter regard, the summation occurs in conjunction with the unrectified signal at resistor 862 and the rectified signal at resistor 864. The ratio of resistance value for respective resistors 862 and 864 is essentially 2 to 1. A second operational amplification stage 866 including feedback resistor 868 provides full wave rectification, the value of resistance at resistor 868 providing for essentially a unity transfer function. The full wave synthesized output of stage 866 at line 870 is submitted to the input of a scaling amplification stage configured additionally to act as as two-pole, low-pass filter as represented at 872. The latter stage 872 functions to effectively remove ripple phenomena at frequencies, for example, below desired lower level 10 Hz. Additionally, the FULL WAVE stage 866 converts the 10 Hz signal to 20 Hz to improve response time. The output of stage 872 at line 874 incorporates scaling resistors 876 and 878, the central tap therebetween representing line 224 which has been described in conjunction with FIG. 12C as being directly coupled to the FS and FB terminals of function switch 32. Thus, with the appropriate orientation of that switch, the output at line 224 is coupled with line 80 which, in turn, is directed to the input of analog-to-digital converter 82.

Figure 15:
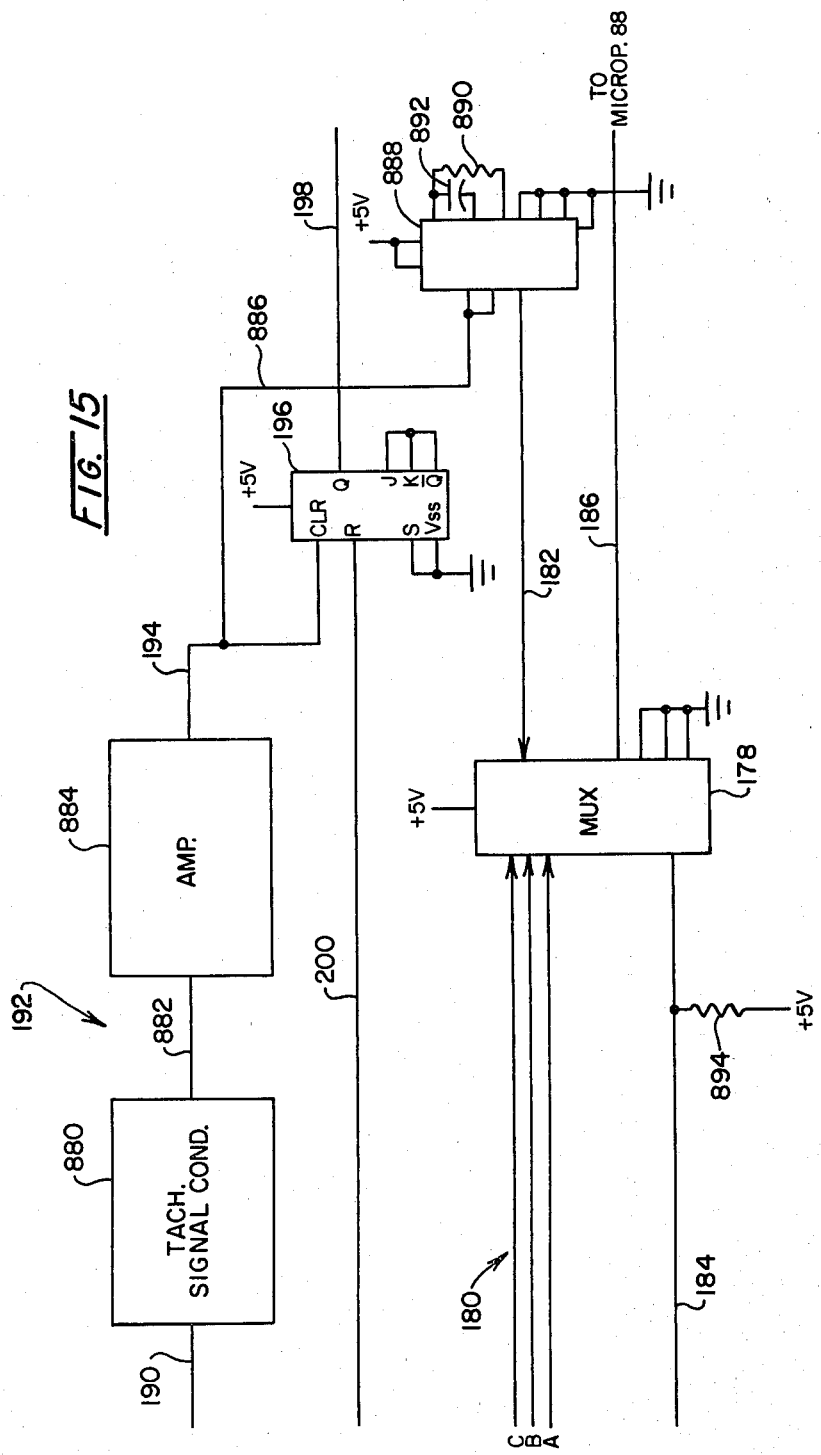
FIG. 15 is a circuit diagram showing tachometer data related components.

Referring to FIG. 15, the tachometer data related components are revealed in enhanced detail. In the Figure, the tachometer signal input representing a cyclically repetitive signal generated from what usually may be considered a rigorous environment, is asserted at the input of a signal conditioning network represented by block 880. Block 880 serves to treat this input to cause the output thereof at line 882 to represent a repetitive signal with a predetermined maximum peak to peak amplitude. The output at line 882 is directed to the input of an amplification stage exhibiting a hysteresis characteristic as represented at block 884. Stage 884 serves to filter high level noise components. A more complete description of the networks represented by blocks 880 and 884 will be found in U.S. Pat. No. 4,035,733, by Morrow et al. The output of amplification stage 884 at line 194 is directed to the clock input of a J-K flip-flop 196. Flip-flop 196 may, for example, be present as a type 4027B marketed by Motorola, Inc., Austin, Tex. The reset input to flip-flop 196 is derived from microprocessor system 88, the connection therewith being represented by earlier described line 200, while the Q terminal output thereof is coupled through line 198 for insertion to the serial in data (SID) terminal of microprocessor system 88. Output line 194 of stage 884 also is coupled via line 886 to the trigger and retrigger inputs of a monostable multivibrator 888 having an output pulse width in its monostable mode determined by resistor 890 and capacitor 892. Multivibrator 888 may, for example, be present as a type 4047 marketed by National Semiconductor, Corp., Santa Clara, Calif. The time constant of multivibrator 888 is selected such that if pulse edges are developed at lines 194 and 886, then a logic high will be present at the Q terminal output thereof at line 182 during the occurrence of such pulses. Line 182 is shown extending from the Q terminal of multivibrator 888 and leads to one of the input terminals of a multiplexer 178. Thus, the signal at line 182 serves ultimately to apprise the microprocessor system 88 that a tachometer is being used with the system. Multiplexer 178 may, for example, be a type NC14051 marketed by Motorola, Inc. (supra). The multiplexer 178 is addressed by a binary coded three-line input represented by line grouping 180 and, additionally, is configured to receive the earlier described encoding signal at line 184, the level of which represents the type transducer being utilized with the system. A pullup resistor 894 is shown coupled between +5 v source and line 184. The output of multiplexer 178 is present at earlier described line 186 which is directed to the input of microprocessor system 88.

Figure 16:
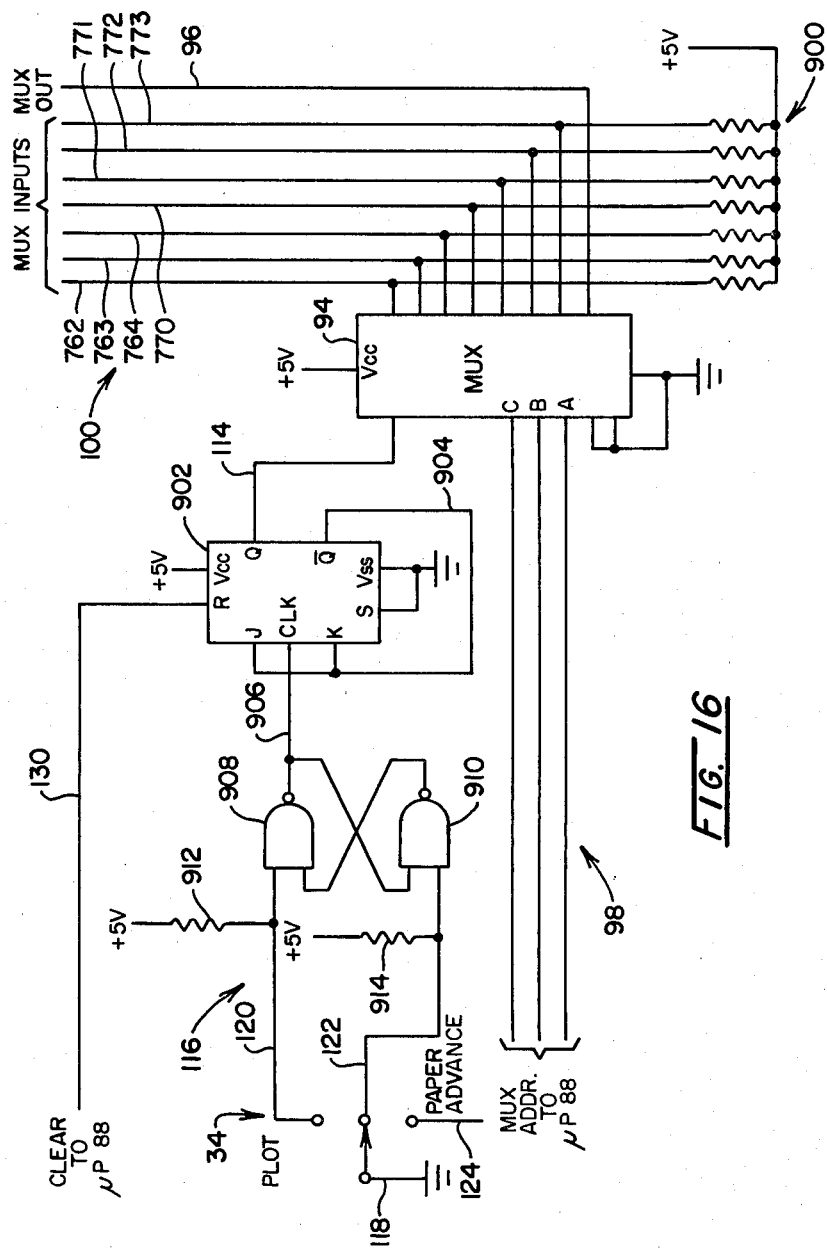
FIG. 16 is a circuit diagram of the apparatus of the invention showing those components providing for the insertion of data from a plot-advance/pause switch as well as level, units, and function switches.

Referring to FIG. 16, the hardware components of apparatus 10 representing the insertion of data from plot-advance/pause switch 34 as well as level switch 28, units switch 30 and function switch 32 are revealed. Central to the above function is a multiplexer earlier described at 94 and again represented with the same numeration. Multiplexer 94 may be present as a type NC14051 marketed, for example, by National Semiconductor Corp. (supra) and having seven inputs thereto deriving from the switch encoding discussed in conjunction with FIG. 12B. Accordingly, lines 762–764 are introduced from level switch function 28b, lines 770 and 771 derive from units function 30e, while lines 772 and 773 derive from function switch block 32d. The output of multiplexer 94 is present at line 96 which line is directed to microprocessor system 88. The input lines as above described and generally represented at 100 each are coupled with a pull up resistor in conventional fashion as represented by resistor array 900. Multiplexer 94 is addressed from line grouping 98 emanating from microprocessor system 88, while the plot-advance/pause switch 34 thereto is derived from line 114 which is coupled to the Q terminal of a J-K flip-flop 902. Flip-flop 902 may, for example, be present as a type NC14027 marketed by National Semiconductor Corp. (supra). The reset input to flip-flop 902 derives from line 130 extending from microprocessor system 88, the $\overline{Q}$ terminal is coupled to the corresponding J-K terminals of the device and the clock input thereto is coupled via line 906 to the output of a cross coupled latch formed of NAND gates 908 and 910. This gate combination provides for the debouncing of switch 34 which again is represented by that number in FIG. 16. In this regard, note that line 120 extends from one pole of switch 34 to an input of NAND gate 908, while line 122 extends from the off position of switch 34 to an input to NAND gate 910. Pull up resistors coupled to +5 v are present at the input of the latch, resistor 912 being coupled between the noted source and line 120, while resistor 914 being coupled between such source and line 122. The arm of switch 34 is coupled via line 118 to ground, and the advance position thereof is coupled by a line 124 to printer control 128 (FIG. 6A).

With the arrangement, microprocessor system 88 scans the output of multiplexer 94 at line 96 while effecting appropriate addresses thereto through line grouping 98. Thus, the appropriate orientation of plot switch 34 as well as switches 28, 30 and 32 will be known to microprocessor system 88. Such information, inter alia, may be processed in accordance with the microinstructions of the system to determine the presence or absence of an improper switch configuration. With respect to the input to multiplexer 94 from line 114, it may be recalled that the system will wait for an actuation of switch 34 to the plot position to effect a high logic level output at line 114 in accordance with the loop described at decision block 254 and loop line 255 in FIG. 7B.

Figure 17B:
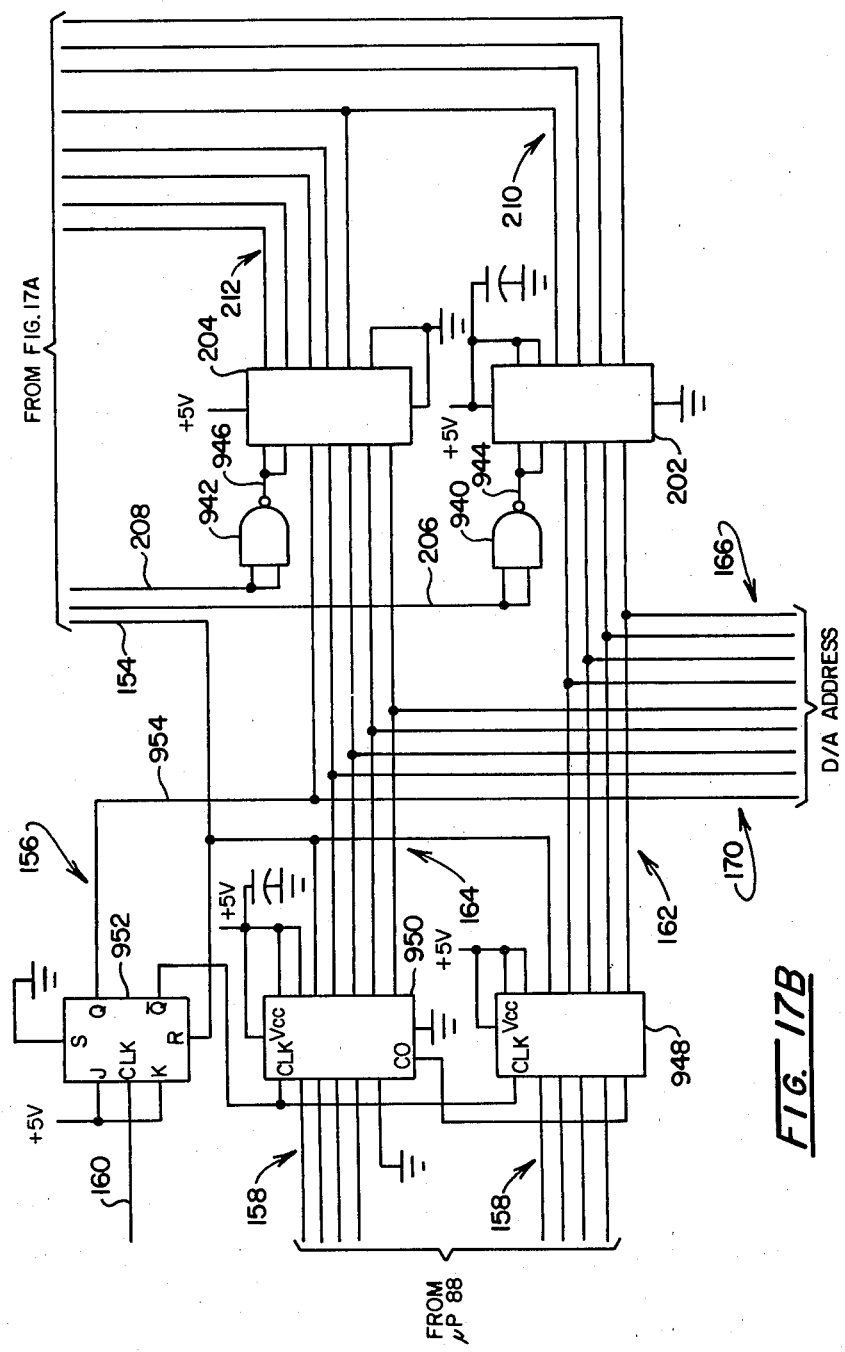

Referring to FIGS. 17A and 17B, the decoding analog-to-digital conversion and counting functions are represented in enhanced detail. Looking to FIG. 17A, analog-to-digital converter 82 again is reproduced. This converter may be present, for example, as a type AD7574 produced by Analog Devices, Inc. (supra). The requisite accurately controlled reference voltage to converter 82 is provided along line 914 which, in turn, extends to a three terminal regulator 916. Output adjustment for the regulator 916 may be provided by a variable resistance arrangement including arm 918 and the associated array of resistance components 920. Regulator 916 may, for example, be present as a type UA79-MO5 marketed by Fairchild Instruments, Inc. An analog input to converter 82 is present at line 80 as earlier described, which line extends to a scaling and buffering amplification stage 922. By appropriate selection of resistance values including those at resistors 924 and 926, a predetermined gain may be effected at stage 922 of the analog input. The opposite input to stage 922 is present at line 928 which extends to a wiper arm 930 which is associated with resistance component array 932, the combination of the latter two components providing for an offset adjustment of the signal presented to converter 82 from along output line 934.

The output of converter 82 as described earlier is present as the eight line grouping described at 84 which is directed to microprocessor system 88. Converter 82 is enabled from decoder 146 which, for example, may be present as a type 4028 BCD-to-decimal decoder marketed by National Semiconductor, Corp. (supra). In this regard, decoder 146 is addressed from three line grouping 148 extending from microprocessor system 88 and is strobed from earlier described line 150 extending from the processor system. Where analog-to-digital conversion is elected by the processor system, a high level is imposed at output line 936 which is asserted at the negative input of an inverter function 152. The resultant inverted output at line 90 extends to both the chip select not, $\overline{CS}$ and read not, $\overline{RD}$, input terminals of converter 82 to effect an active low enablement.

The opposite input to stage 152 is present at line 938 which carries the 2.5 v supply from power supply 784 (FIG. 13) and serves to cause the operation of a conventional amplifiction stage as an inverter function.

When appropriately addressed and strobed through line grouping 148 and line 150, decoder 146 also provides an enabling command along line 140 to printer control network 128.

Looking additionally to FIG. 17B, output lines 206 and 208 of decoder 146 are shown extending to the inputs of inverter functions shown respectively as NOR gates 940 and 942. Gates 940 and 942 convert an enabling logic high signal at their inputs to a low valuation at their respective outputs at lines 944 and 946. The latter input lines serve to provide an active low enablement of non-inverting three-state buffers shown respectively at 202 and 204. The outputs of buffers 202 and 204 are shown, respectively, as busses 210 and 212 which extend to common connection with buss or line grouping 84 extending from converter 82. The lead of busses 210 and 212 ultimately lead to connection with microprocessor system 88 and function in conjunction with the earlier described counter advance test procedure.

Input to the buffers 202 and 204 emanates from a counter function identified in general at 156 (buffers 202 and 204 may be of type MC14503B marketed by Motorola, Inc. (supra)) The counter function 156 is comprised of two binary/decade up/down counters 948 and 950 and, additionally, to provide a 9-bit counter output, a J-K flip-flop 952. Counters 948 and 950 may be present, for example, as type MC14029B marketed by Motorola, Inc. (supra), while flip-flop 952 may be present, for example, as a type MC14027B marketed by the same organization. The output of counter 948 is present at the earlier designated four line most significant bit grouping 162, while the outputs of counter 950 and flip-flop 952 are present as the earlier described five line least significant bit grouping 164. More particularly, the output line of J-K flip-flop 952 represented in that group also is identified at 954. The counter array 156 is advanced by signals from the microprocessor system 88 through earlier described line 160 and its output, serving to address digital-to-analog converter 168 (FIG. 14) is shown present as a nine-line input corresponding with line groupings 166 and 170. Counters 948 and 950 also are configured for receiving a predetermined binary or jam input from earlier described eight line grouping 158. The counters are configured for up counting and are loaded with the predetermined jam inputs from a signal asserted from decoder 146 along line 154.

Figure 18:
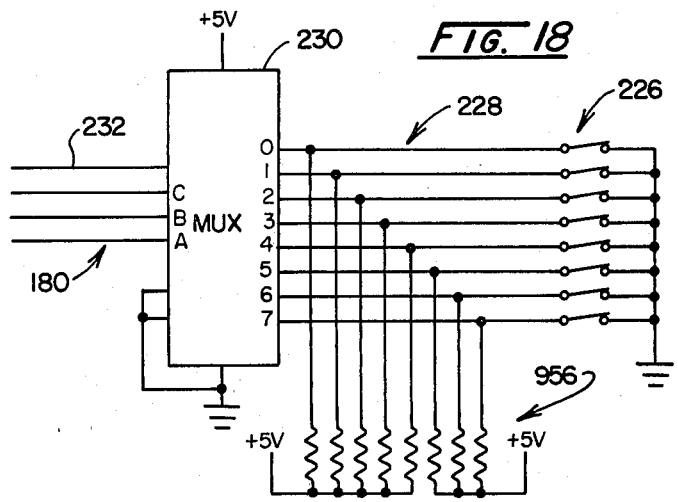
FIG. 18 is a circuit diagram showing a multiplexing and frequency switch circuit of the invention.

Looking to FIG. 18, the components providing for selective insertion of test frequency or counter jam values are revealed. Selection of the normal test frequencies is made by a eight component single pull, single throw switch bank represented generally at 226. The eight leads extending from the individual components of switch 226 are coupled with +5 v through resistor array 956 and extend to the eight input terminals of multiplexer 230. Multiplexer 230 may, for example, be present as a type MC14051B device marketed by Motorola, Inc. (supra). The output of multiplexer 230 as present at line 232 which is directed to microprocessor system 88, and the addresses thereto, extend through three line grouping 180. Thus, the eight bit input to the multiplexer 230 are addressed by the binary three bit input.

Figure 19:
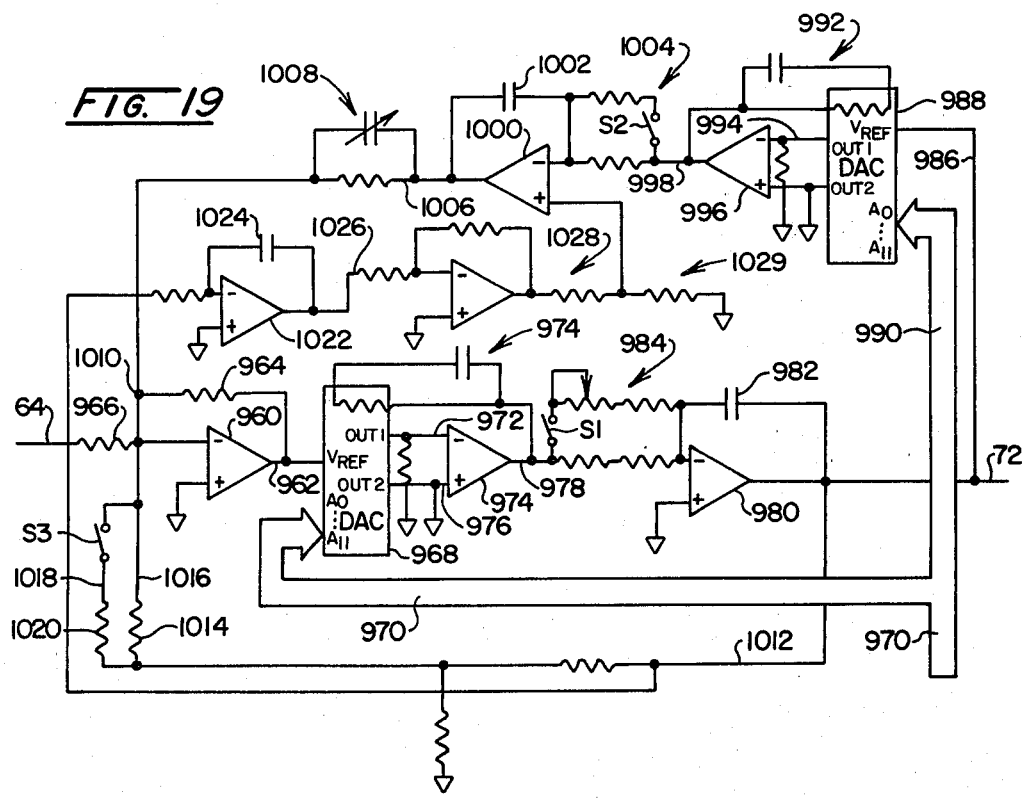
FIG. 19 is a schematic circuit diagram of a step tuned filter which may be utilized with the circuit of the invention.

Another approach to providing a step tuned filter as represented in FIG. 5A at 66 is represented in FIG. 19. Referring to that Figure, a state variable filter is shown as receiving the overall ac signal at line 64 from signal conditioner 52. The signal is introduced to one input of a summing operational amplifier 960. The opposite input to that amplifier is coupled to ground, and the output thereof is provided at line 962. A scaling ratio for the summing amplifier 960 is provided by resistors 964 and 966. Line 962, representing a high-pass signal, is introduced to the $V_{REF}$ terminal of a 12-bit multiplying digital-to-analog converter 968. Converter 968 may, for example, be present as a type AD7542 Microprocessor Compatible 12-Bit DAC marketed by Analog Devices, Inc. (supra). The device includes three, 4-bit data registers, a 12-bit DAC register, address decoding logic and a 12-bit CMOS multiplying DAC. Data is loaded to the data registers in three 4-bit bytes and subsequently is transferred to the 12-bit DAC register. Such loading of a control word directly from microprocessor system 88 is represented at bus 970. This word is derived directly by microprocessor system 88 in correspondence with each of the aforesaid bin numbers and is appropriately scaled and computed for each such bin. As indicated above, the computed value is asserted serially in 4-bit components at bus 970. The control word thus provided from bus 970 to the input terminals of DAC 968 is multiplied in appropriately scaled fashion with the signal at line 962 to provide a current proportioned to that product at output line 972. Scaling for DAC 968 is represented generally at 974. Line 972 is shown directed to one input of an inverting operational amplifier 974, output line 972 also being coupled to a compensation network comprised of a resistor coupled to ground. The opposite input to amplifier 974 is provided from the OUT 2 terminal of DAC 968 at line 976, which line additionally is coupled to ground. An output line 978 is shown extending from amplifier 974 to the input of an integrator network comprised of an operational amplifier 980, capacitor 982 and a tuning resistor network 984. The integration stage for the variable filter works with different tuning for low frequency ranges; thus, a switch schematically represented at S1 is provided for adjusting network 984 for low and high end operation. The switch may be present as an earlier described DMOS analog switch controlled from microprocessor system 88. The output of the integration stage including operational amplifier 980 is presented at filter output line 72 as earlier described. Line 72, in turn, is coupled to line 986 which extends to the $V_{REF}$ terminal of another multiplying digital-to-analog converter (DAC) 988. Identical to DAC 968, converter 988 receives the same 12-bit control word data as is directed to DAC 968 from along 8-bit bus 990 which represents a branching from bus 970. Operating in identical fashion, the converter 988 includes a scaling capacitor and resistor as shown generally at 992 and performs a multiplication to provide an output at line 994 leading to an inverting operational amplifier 996. The opposite input to amplifier 996 is coupled to ground, and the output thereof at line 998 is directed to another integration stage including operational amplifier 1000 which is coupled in integrator fashion with integrating capacitor 1002 and tuning resistor network 1004. As before, an analog switch designated S2 which is controlled from microprocessor system 88 provides for high and low frequency range selection. The output of this integration stage is presented at line 1006 and is directed through a calibration network shown generally at 1008 to a summing point 1010 at the input to summing amplifier 960.

A negative feedback including lines 1012 and 1016 is coupled between the output of amplification stage 980 at line 72 and the input to summing amplification stage 960 at line 64. Line 1016 is shown incorporating a resistor 1014 and is positioned adjacent a parallel connected line 1018 incorporating a resistor 1020. A switch S3 selectively associates resistors 1014 and 1020 in parallel relationship. Switch S3 also may be present as a DMOS analog switch and is opened to provide for enhanced resistance and consequently less feedback to permit the operation of the state variable filter at a higher Q for example, 20. Where switch S3 is closed, a lower Q operation is evoked. Switch S3 ultimately is operated, as before, in conjunction with the positioning of channel switch 32.

Line 1012 also extends to the input of an integration stage including operational amplifier 1022 having a feedback path including integrating capacitor 1024. The output of integration stage 1022 at line 1026 is introduced to a unity gain amplification stage represented generally at 1028, the output of which is coupled to one input of amplification stage 1000 through voltage divider 1029. This arrangement provides an integration and feedback intended to retain the signal value at line 72 at an appropriately lower value in terms of offset voltage to correct for generally encountered integration stage vagaries.

Returning to FIGS. 5A and 5B, it may be seen that the state variable filter described in conjunction with FIG. 19 will operate in direct association with microprocessor system 88, thus counter 156 as well as converter 168 in scaling amplification stage 174 would not be utilized with the system. However, the state variable filter would operate in conjunction with the dwell interval considerations described earlier herein. It may be observed that the preferred state variable filter approach utilizes fewer components to permit cost savings.

Since certain changes may be made in the above-described system and apparatus without departing from the scope of the invention herein, it is intended that all matter contained in the description thereof or shown in the accompanying drawings shall be interpreted as illustrative and not in a limiting sense.

We claim:

1. Apparatus for use in carrying out vibration analysis of a variety operable in conjunction with transducers having a vibration responsive output, comprising:

conditioning means for selectively treating said vibration responsive output in accordance with a select vibrational parameter to provide a parameter related signal;

filter means selectively responsive to said parameter related signal, tunable over a predetermined range of frequencies in response to stepped inputs applied thereto in numbers of n steps per selected bandwidth for providing corresponding filtered output signals;

analog-to-digital converter means selectively responsive to said filtered output signals for deriving digital characterized signals corresponding therewith;

printer means responsive to print signals for generating a printout of data indicative of amplitude values corresponding with each one of said n steps and said filter output signals;

level switch means having a plurality of orientation responsive electible output conditions, each corresponding with a predetermined scale factor for said vibration responsive output; and control means responsive to said analog-to-digital converter means digital characterized signals, including processor means having memory means for effecting the deviation of said stepped inputs in correspondence with each of said n steps, said processor means deriving said print signals for effecting a said printer means printout of a frequency labeled, graphically represented pattern corresponding with said selected parameter, said processor means being responsive to an elected said level switch means output condition for effecting a said printer means printout of said pattern in combination with an amplitude scale pattern corresponding with said scale factor.

2. The apparatus of claim 1 in which said value, n, consists of a positive number.

3. The apparatus of claim 1 in which n is a positive number having a value of at least about 3.

4. The apparatus of claim 1 in which said control means processor means derives said stepped inputs in correspondence with each of said n steps, such that each said step has a dwell interval at least equivalent to $KQ^2/(1+K)f$, as n approaches infinity, where Q is the quality factor of said filter means, K, is a constant expressing the relationship between successive step dependent center frequencies, and f is the center frequency associated with a given, next preceding one of said n steps.

5. The apparatus of claim 1 including:

converter means for deriving said parameter related signal as an amplitude related d.c. signal; and analog meter means responsive to said d.c. amplitude related signal for providing a visual indication of scale and analysis acceptability.

6. The apparatus of claim 1 including:

test signal oscillator means energizable to effect the assertion of a test signal of predetermined frequency and amplitude at said filter means; and means for selectively effecting said test signal oscillator means energization.

7. The apparatus of claim 1 in which:

said control means processor means derives said print signals to effect a said printer means printout of data indicative of said amplitude values in histographic format.

8. The apparatus of claim 7 in which said processor means is responsive to said digital characterized signals for deriving said print signals to effect a said printer means printout of each said amplitude value in linear form commencing with a position representing a predetermined fraction of peak value of said amplitude and extending in increasing amplitude value therefrom.

9. The apparatus of claim 8 in which said predetermined fraction is one-half.

10. The apparatus of claim 9 in which n is a positive number having a value of at least about 3.

11. The apparatus of claim 1 including:
converter means for deriving said parameter related signals as amplitude related, d.c. signals;
function switch means actuable for selectively coupling said amplitude related, d.c. signals to said converter means to effect derivation of said digital characterized signals representing said amplitude related d.c. signals; and
said control means processor means is responsive to said function switch means actuation for deriving said print signals in correspondence with said digital characterized signals representing said amplitude related d.c. signals and effecting a said printer means printout of a continuous, time increment defining and labeled graphically represented succession of reference lines.

12. The apparatus of claim 11 including:
test signal oscillator means energizable to effect the assertion of a test signal of predetermined frequency and amplitude at said converter means; and
means for selectively effecting said test signal oscillator means energization.

13. The apparatus of claim 1 in which:
said processor means derives a sequence of control outputs, each corresponding with a predetermined dwell interval; and
including tuning means responsive to said processor means control outputs for deriving and applying said stepped inputs to said filter means.

14. The apparatus of claim 1 in which:
said processor means derives a sequence of control outputs, each corresponding with a select one of said n steps;
said control means includes counter means actuable in response to each said control output for deriving a corresponding unique digital signal of a predetermined sequence thereof; and
digital-to-analog converter means responsive to each said counter means unique digital signal for deriving each said stepped input to said filter means as a predetermined voltage level.

15. The apparatus of claim 14 in which said filter means is present as a voltage tunable variety exhibiting a constant Q characteristic wherein the passband center frequency thereof is selectible as an exponential function of said predetermined voltage level.

16. The apparatus of claim 14 in which:
said counter means is configured for asserting said unique digital output to said digital-to-analog converter means and, in response to an advance test signal, conveying said digital output to said processor means; and
said processor means includes means for asserting a predetermined test digital signal to said counter means in association with a said advance test signal for carrying out a comparison test to said counter means output with said asserted test digital signal.

17. Apparatus for use in carrying out vibrational anaylsis of a variety operable in conjunction with transducers having a vibration responsive output, comprising:

connector means for receiving a tachometer signal present as a sequence of pulses each corresponding with a revolution of a component of a device under analysis and having an output condition when operatively associated with said tachometer;
conditioning means for selectively treating said vibration responsive output in accordance with a select vibrational parameter to provide a parameter related signal;
filter means selectively responsive to said parameter related signal, tunable over a predetermined range of frequencies in response to stepped inputs applied thereto in numbers of n steps per selected bandwidth for providing corresponding filtered output signals;
analog-to-digital converter means selectively responsive to said filtered output signals for deriving digital characterized signals corresponding therewith;
printer means responsive to print signals for generating a printout of data indicative of amplitude values corresponding with each one of said n steps, and a printout of rotational rate in revolutions per minute; and
control means responsive to said analog-to-digital converter means digital characterized signals for effecting the derivation of said print signals and said stepped inputs in correspondence with each of said n steps, said control means including processor means responsive to said sequence of pulses in the presence of said output condition for accumulating said pulses over a predetermined interval, applying a multiplication factor to the accumulated value thereof and generating print signals corresponding with the product thereof.

18. The apparatus of claim 17 including:
level switch means having a plurality of selectible output conditions each corresponding with a predetermined scale factor for said vibration responsive output; and
said control means processor means is responsive to said level switch means selected output condition for effecting a said printer means printout of said reference lines in combination with an amplitude scale pattern corresponding with said scale factor.

19. The apparatus of claim 17 in which n is a positive integer having a value of at least about 3.

20. Apparatus for use in carrying out vibrational analysis of a variety operable in conjunction with transducers having a vibration responsive output, comprising
signal treatment means for treating said vibration responsive output and including filter means responsive to progressively varying stepped tuning inputs applied thereto in numbers of n steps per selected bandwidth for providing corresponding filtered output signals over a predetermined range of frequencies and relating vibrational frequency values with corresponding amplitude values;
level switch means having a plurality of orientation responsive electible output conditions, each corresponding with a predetermined scale factor for said vibration responsive output;
analog-to-digital converter means responsive to said filtered output signals for deriving digital characterized signals corresponding therewith;
readout means responsive to input signals for generating a visual readout representing a plurality of amplitude values corresponding with said related frequency values; and control means responsive to said analog-to-digital converter means digital characterized signals and including processor means for deriving said tuning inputs and for deriving said input signals to said readout means in correspondence with each said step to effect a said visual readout in substantially histographic form wherein selected ones of said amplitude values are represented as a substantially linear form image component formed in correspondence with each said step, each said image component commencing with a position of said amplitude representing a predetermined fraction of peak value of said amplitude and extending in increasing amplitude value therefrom toward said peak value, said processor means being responsive to an elected said level switch means output condition and including memory retaining data retrievable for effecting a said visual readout of a frequency labeled, graphically represented pattern in combination with an amplitude scale pattern corresponding with said scale factor.

21. The apparatus of claim 20 in which said predetermined fraction is one-half.

22. The apparatus of claim 20 in which said readout means comprises printer means responsive to said input signals for progressively generating a printout on a paper medium as said visual readout.

23. The apparatus of claim 20 in which said filter means is a state variable filter.

24. The apparatus of clalim 20 in which said filter means is a state variable filter incorporating multiplying digital-to-analog converters responsive to said tuning inputs.

25. The apparatus of claim 24 in which said tuning inputs are generated and applied to said state variable filter directly from said processor means.

26. The apparatus of claim 20 in which n is a positive integer having a value of at least about 3.

27. The apparatus of claim 26 in which said readout means comprises printer means responsive to said input signals for progressively generating a printout on a paper medium as said visual readout.

28. The apparatus of claim 20 in which said predetermined fraction is one-half.

29. The apparatus of claim 20 in which said readout means comprises printer means responsive to said input signals for progressively generating a printout on a paper medium as said visual readout.

30. The apparatus of claim 20 including:
test signal oscillator means energizable to effect the assertion of a test signal of predetermined frequency and amplitude at said filter means; and
means for selectively effecting said test signal oscillator means energization.

31. The apparatus of claim 20 in which said frequency labeled pattern is logrithmic.

32. The apparatus of claim 20 in which:
said signal treatment means includes conditioning means for selectively treating said vibration responsive output in accordance with a select vibrational parameter to provide a parameter related signal; and
said filter means is selectively responsive to said parameter related signal to provide said filtered output signals.

33. The apparatus of claim 32 including:

converter means for deriving said parameter related signal as an amplitude related, d.c. signal; and
analog meter means responsive to said d.c. amplitude related signal for providing a visual indication of scale and analysis acceptability.

34. The apparatus of claim 32 including:
converter means for deriving said parameter related signals as amplitude related, d.c. signals;
function switch means actuable for selectively coupling said amplitude related, d.c. signals to said converter means to effect derivation of said digital characterized signals representing said amplitude related d.c. signals; and
said processor means is responsive to said function switch means actuation for deriving said printer means input signals in correspondence with said digital chracterized signals representing said amplitude related d.c. signals and effecting a printer means printout of a continuous, time increment defining and labeled graphically represented succession of reference lines.

35. Apparatus for use in carrying out vibrational analysis of a variety operable in conjunction with transducers having a vibration responsive output comprising:
signal treatment means for treating said vibration responsive output and including filter means responsive to progressively varying stepped tuning inputs applied thereto in numbers of n steps per selected bandwidth over a predetermined range of frequencies for providing corresponding filtered output signals relating vibrational frequency values with corresponding amplitude values;
level switch means having a plurality of orientation responsive electible output conditions, each corresponding with a predetermined scale factor for said vibration responsive output;
analog-to-digital converter means responsive to said filtered output signals for deriving digital characterized signals corresponding therewith;
readout means responsive to input signals for generating a visual readout representing a plurality of amplitude values corresponding with said related frequency values in a graphically represented pattern; and
control means responsive to said analog-to-digital converter means digital characterized signals for effecting the derivation of said readout means input signals and said stepped inputs in correspondence with each of said n steps such that each said step has a dwell interval at least equivalent to $KQ^2/(1+K)f$ as n approaches infinity, where Q is the quality factor of said filter means, K is a constant expressing the relationship between successive, step dependent center frequencies, and f is the center frequency extant at a given, next preceding one of said n steps, said processor means being responsive to an elected said level switch means output condition for effecting a said visual readout of said pattern in combination with an amplitude scale pattern corresponding with said scale factor.

36. The apparatus of claim 35 in which said control means includes processor means for deriving said input signals to said readout means to effect a said visual readout in substantially histographic form wherein said amplitude values are represented as linear form image components, each commencing with a position of said amplitude representing a predetermined fraction of peak value of said amplitude and extending in increasing amplitude value therefrom toward said peak value.

37. The apparatus of claim 36 in which said predetermined fraction is one-half.

38. The apparatus of claim 36 in which n is a positive integer having a value of at least about 3.

39. The apparatus of claim 35 in which said readout means comprises printer means responsive to said input signals for progressively generating a printout on a paper medium as said visual readout.

40. The method for deriving a readout of the vibrational aspects of a dynamic device, comprising the steps of:
   monitoring said device by transducer operational association therewith to provide a vibration responsive output;
   providing a filter for filtering said vibration responsive output in stepwise fashion over a predetermined range of frequencies by applying tuning inputs thereto in numbers of n steps per selected bandwidth, each such step having a dwell interval at least equivalent to $KQ^2/(1+K)f$ as n approaches infinity, where Q is the quality factor of said filter, K is a constant expressing the relationship between successive, step dependent center frequencies, and f is a center frequency associated with a given, next preceding one of said n steps;
   providing a level selection switch having a plurality of orientation responsive electible output conditions, each corresponding with a predetermined scale factor for said vibration responsive output;
   actuating said level selection switch to elect a select said output condition;
   deriving a succession of filtered output signals; and
   providing a frequency vs. amplitude value readout in response to said digital signals, said amplitude readout being effected in conjunction with an amplitude scale pattern corresponding with said elected output condition.

41. The method of claim 40 in which said readout is provided in histographic format.

42. The method of claim 41 in which said readout is provided in a manner wherein said amplitude values are represented as linear form image components corresponding with each said step, each said component commencing with a graphic position of said amplitude value representing a predetermined fraction of peak value of said amplitude and extending in increasing amplitude value therefrom toward said peak value.

43. The method of claim 42 in which said fraction is one-half.

44. The method of claim 42 in which n is an integer having a value of at least about 3.

45. The method for deriving a readout of the vibrational aspects of a dynamic device comprising the steps of:
   operationally associating a transducer with said device to provide a vibration responsive output;
   providing a level selection switch having a plurality of orientation responsive electible output conditions, each corresponding with a predetermined scale factor for said vibration responsive output;
   actuating said level selection switch to elect a select said output condition;
   providing a filter treatment of said vibration responsive output in a manner deriving a stepped output, each such step corresponding with a predetermined frequency and n such steps being generated per selected filter bandwidth; and
   treating said stepped output to provide a visual readout of amplitude vs. frequency values in histographic format wherein said amplitude values are represented as linear form image components corresponding with each said step, each said component commencing with a graphic position of said amplitude representing a predetermined fraction of peak value thereof and extending in increasing amplitude value therefrom toward said peak value, said amplitude image components being graphically presented in conjunction with an amplitude scale pattern corresponding with said elected output condition.

46. The method of claim 45 in which n is an integer having a value of at least 3.

47. The method of claim 45 in which said fraction is one-half.

* * * * *